(12) United States Patent
Smith et al.

(10) Patent No.: US 12,244,045 B2
(45) Date of Patent: *Mar. 4, 2025

(54) ELECTRICAL CONNECTOR CONFIGURED FOR CONNECTING A PLURALITY OF WAVEGUIDES BETWEEN A PRINTED CIRCUIT BOARD AND AN ELECTRONIC COMPONENT

(71) Applicant: FCI USA LLC, Etters, PA (US)

(72) Inventors: Stephen B. Smith, Mechanicsburg, PA (US); Madhumitha Rengarajan, Mechanicsburg, PA (US); Kapil Sharma, State College, PA (US)

(73) Assignee: FCI USA LLC, Etters, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/494,744

(22) Filed: Oct. 25, 2023

(65) Prior Publication Data

US 2024/0097299 A1 Mar. 21, 2024

Related U.S. Application Data

(63) Continuation of application No. 17/328,813, filed on May 24, 2021, now Pat. No. 11,855,326, which is a continuation of application No. 16/074,660, filed as application No. PCT/US2017/016004 on Feb. 1, 2017, now Pat. No. 11,018,402.

(60) Provisional application No. 62/289,794, filed on Feb. 1, 2016.

(51) Int. Cl.
| | |
|---|---|
| *H01P 1/04* | (2006.01) |
| *H01P 1/02* | (2006.01) |
| *H01P 3/16* | (2006.01) |
| *H01P 5/02* | (2006.01) |
| *H01P 5/08* | (2006.01) |
| *H04B 3/52* | (2006.01) |

(52) U.S. Cl.
CPC ............. *H01P 1/042* (2013.01); *H01P 1/022* (2013.01); *H01P 3/16* (2013.01); *H01P 5/024* (2013.01); *H01P 5/08* (2013.01); *H04B 3/52* (2013.01)

(58) Field of Classification Search
CPC .......... H01P 1/042; H01P 1/022; H01P 1/025; H01P 1/027; H01P 5/08
USPC ........................................ 333/24 R, 248, 249
See application file for complete search history.

(56) References Cited

U.S. PATENT DOCUMENTS

| | | |
|---|---|---|
| 3,745,515 A | 7/1973 | Michaels |
| 4,600,480 A | 7/1986 | Coombes et al. |
| 5,468,918 A | 11/1995 | Kanno et al. |

(Continued)

FOREIGN PATENT DOCUMENTS

| | | |
|---|---|---|
| CN | 1502146 A | 6/2004 |
| CN | 1529924 A | 9/2004 |

(Continued)

OTHER PUBLICATIONS

Chinese office action for Chinese Application No. 201780009098.9 dated Jan. 2, 2020.

(Continued)

*Primary Examiner* — Benny T Lee
(74) *Attorney, Agent, or Firm* — Wolf, Greenfield & Sacks, P.C.

(57) ABSTRACT

High speed waveguide-based data communication systems are disclosed. Such systems may include separable electrical connectors, forming signal propagation paths between electronic assemblies with one or more waveguides.

20 Claims, 6 Drawing Sheets

(56) References Cited

U.S. PATENT DOCUMENTS

| | | |
|---|---|---|
| 6,109,959 A | 8/2000 | Burlinson et al. |
| 6,176,744 B1 | 1/2001 | Zito et al. |
| 6,532,315 B1 | 3/2003 | Hung et al. |
| 6,590,477 B1 | 7/2003 | Elco |
| 6,724,281 B2 | 4/2004 | Elco |
| 7,316,585 B2 | 1/2008 | Smith et al. |
| 7,670,180 B2 | 3/2010 | Gerard et al. |
| 8,382,522 B2 | 2/2013 | Glover et al. |
| 8,465,469 B2 | 6/2013 | Brightbill |
| 8,540,434 B2 | 9/2013 | Kruchowski et al. |
| 8,905,785 B2 | 12/2014 | Johnescu et al. |
| 9,450,344 B2 | 9/2016 | Cartier, Jr. et al. |
| 10,535,959 B2 | 1/2020 | Copper |
| 11,018,402 B2 | 5/2021 | Smith et al. |
| 11,056,841 B2 | 7/2021 | Copper |
| 11,855,326 B2 | 12/2023 | Smith et al. |
| 2002/0168149 A1 | 11/2002 | Nakura et al. |
| 2005/0017818 A1 | 1/2005 | Kinayman et al. |
| 2007/0188257 A1 | 8/2007 | Brunker et al. |
| 2008/0220658 A1 | 9/2008 | Caveney et al. |
| 2011/0256763 A1 | 10/2011 | De Geest et al. |
| 2011/0274394 A1 | 11/2011 | Kruchowski et al. |
| 2012/0244728 A1 | 9/2012 | Rathburn |
| 2012/0306587 A1 | 12/2012 | Strid et al. |
| 2012/0319891 A1 | 12/2012 | Edvardsson et al. |
| 2013/0050841 A1 | 2/2013 | Mathai et al. |
| 2014/0174781 A1 | 6/2014 | Do |
| 2015/0168652 A1 | 6/2015 | Hamamoto |
| 2017/0271738 A1 | 9/2017 | Smith, Jr. et al. |
| 2018/0287308 A1 | 10/2018 | Copper |
| 2019/0190106 A1 | 6/2019 | Kamgaing et al. |
| 2020/0076039 A1 | 3/2020 | Smith |
| 2020/0153172 A1 | 5/2020 | Copper |
| 2021/0384603 A1 | 12/2021 | Smith et al. |
| 2022/0021162 A1 | 1/2022 | Copper |

FOREIGN PATENT DOCUMENTS

| | | |
|---|---|---|
| CN | 1902990 A | 1/2007 |
| CN | 101052906 A | 10/2007 |
| CN | 102449516 A | 5/2012 |
| JP | 2012-119263 A | 6/2012 |
| WO | WO 00/050942 A1 | 8/2000 |
| WO | WO 02/058191 A2 | 7/2002 |
| WO | WO 02/101882 A2 | 12/2002 |

OTHER PUBLICATIONS

International Search Report and Written Opinion for International Application No. PCT/US2017/016004 dated Apr. 25, 2017.

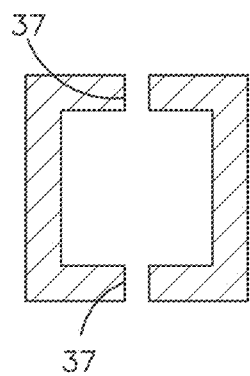
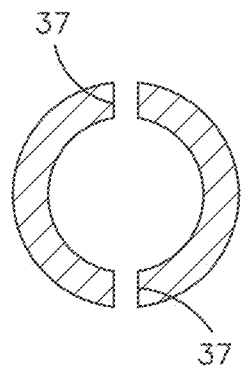
Fig.2A  Fig.2B
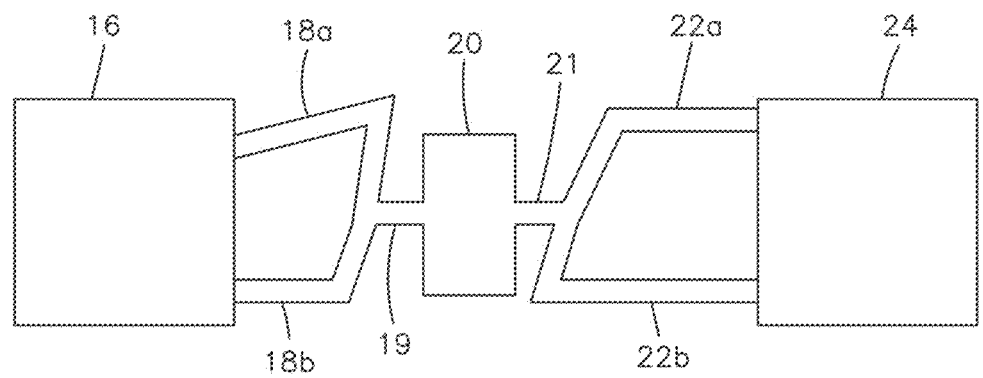
Fig.3

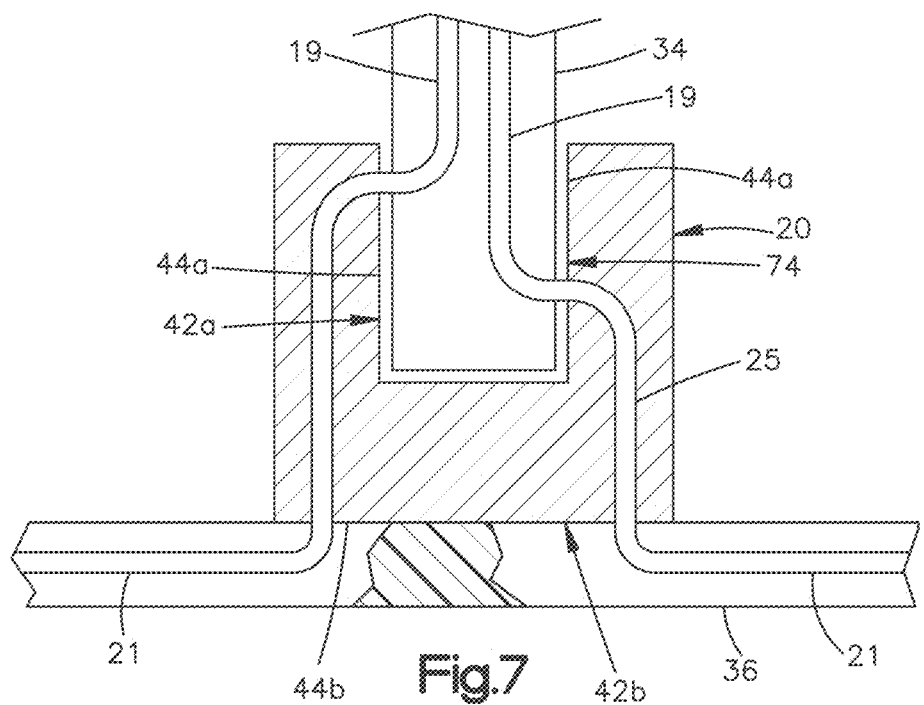
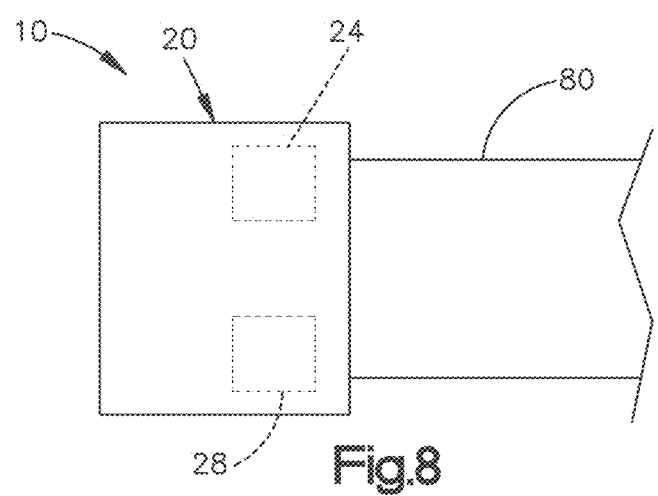

ELECTRICAL CONNECTOR CONFIGURED FOR CONNECTING A PLURALITY OF WAVEGUIDES BETWEEN A PRINTED CIRCUIT BOARD AND AN ELECTRONIC COMPONENT

CROSS-REFERENCE TO RELATED APPLICATIONS

This application is continuation of U.S. patent application Ser. No. 17/328,813, filed on May 24, 2021, entitled "ELECTRICAL CONNECTOR CONFIGURED FOR CONNECTING A PLURALITY OF WAVEGUIDES BETWEEN MATING AND MOUNTING INTERFACES," now U.S. Pat. No. 11,855,326, which is a continuation of U.S. patent application Ser. No. 16/074,660, filed on Aug. 1, 2018, now U.S. Pat. No. 11,018,402, issued May 25, 2021, entitled "HIGH SPEED DATA COMMUNICATION SYSTEM," which is a 35 U.S.C. § 371 National Phase filing of International Application No. PCT/US2017/016004, filed Feb. 1, 2017, entitled "HIGH SPEED DATA COMMUNICATION SYSTEM," which claims priority to and the benefit of U.S. provisional application Ser. No. 62/289,794, filed Feb. 1, 2016. The entire contents of these applications are incorporated herein by reference in their entirety.

BACKGROUND

Waveguide systems are disclosed in U.S. Pat. Nos. 6,724,281 and 6,590,477, the disclosure of each of which is hereby incorporated by reference as if set forth in its entirety herein.

SUMMARY

This disclosure describes a waveguide-based data communication system.

BRIEF DESCRIPTION OF THE DRAWINGS

FIG. 2A is a cross-sectional view of a waveguide geometry of the data communication system illustrated in FIG. 1 in accordance with one embodiment;

FIG. 2B is a cross-section view of a waveguide of the data communication system illustrated in FIG. 1 in accordance with another embodiment;

FIG. 3 is a schematic view of a waveguide transmission system of the data communication system illustrated in FIG. 1 constructed in accordance with another embodiment;

FIG. 7 is a cross-sectional view of a data communication system illustrated in FIG. 1, but showing the electrical connector as an edge card connector, one of the substrates of the data communication system of FIG. 1 shown inserted into a receptacle of the electrical connector, and showing the electrical connector mounted to the other of the substrates of the data communication system of FIG. 1; and FIG. 8 is a schematic view of a data communication system similar to the data communication system illustrate in FIG. 1, but showing the electrical connector as an input/output (I/O) cable connector according to another embodiment.

DETAILED DESCRIPTION

It is desirable to increase data transfer speeds from 14.4 Gbits/sec to 28.8 Gbits/sec, from 28.8 Gbits/sec to 56 Gbits/sec, from 56 Gbits/sec to 112 Gbits/sec and so on. Actually increasing the data transfer speeds while maintaining signal integrity (transmitted 1's are received as 1's and transmitted 0's are received as 0's) is a monumental task.

Figure 1:
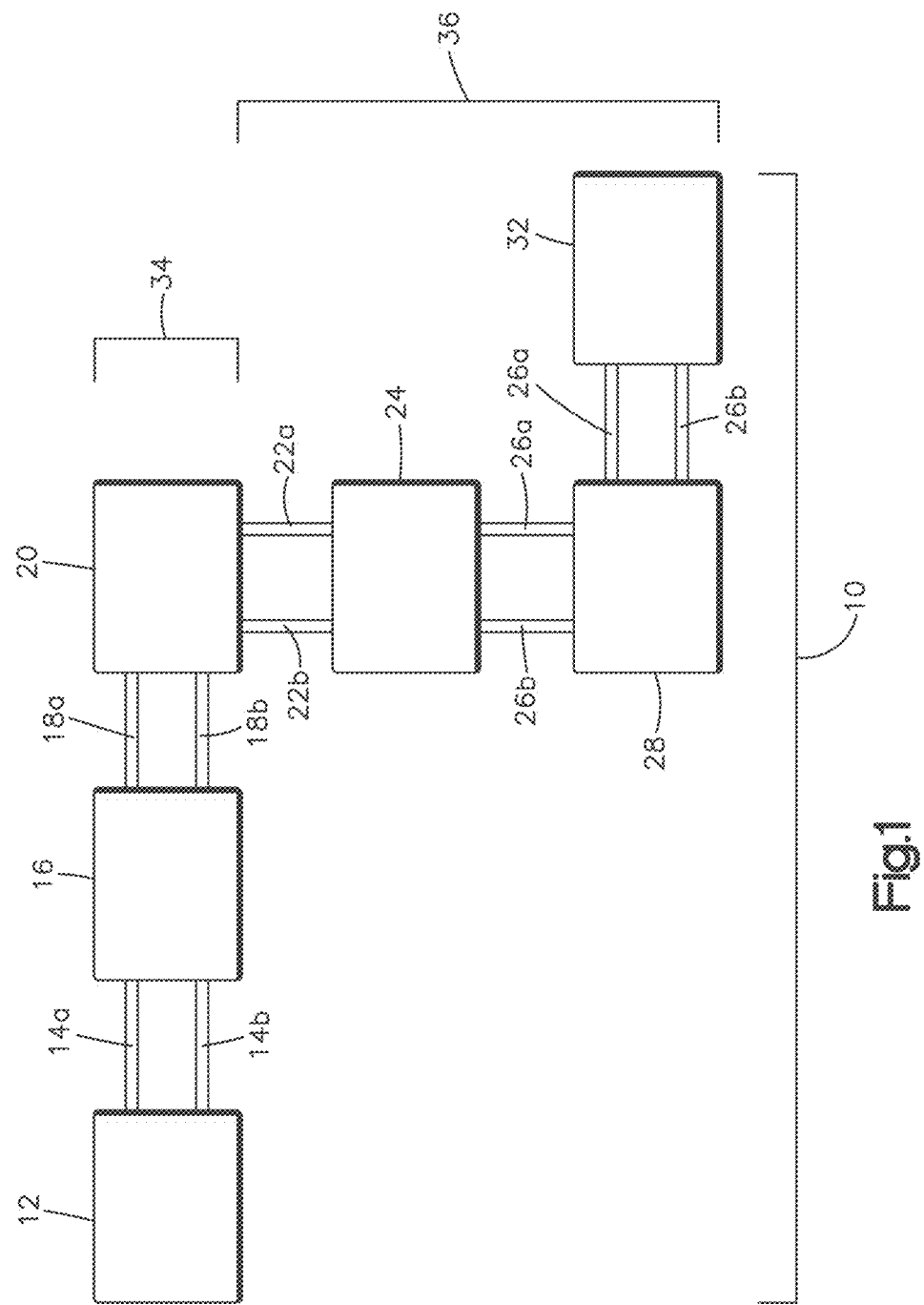
FIG. 1 is a schematic view of a data communication system according to one embodiment.

Referring to FIG. 1, a data communication system 10 in accordance with one embodiment includes a first electrical component such as a first substrate 34, a second electrical component such as a second substrate 36, and an electrical connector 20 configured to be placed in electrical communication with each of the first and second electrical components, such as the first and second substrates 34 and 36, respectively.

The first substrate 34 can include a transmit signal device. The transmit signal device can be constructed as a transmit signal chip 12. The first substrate 34 can further include first and second electrical signal traces 14a and 14b that can be single-ended or can define a differential pair of traces that are electrically connected to the transmit signal chip 12. The first substrate 34 can further include a signal modulator 16 that is electrically connected to each of the first and second signal traces 14a and 14b. Thus, the first and second electrical signal traces 14a and 14b are electrically connected between the transmit signal chip 12 and the signal modulator 16. For instance, the first and second electrical signal traces 14a and 14b can have respective input ends that are configured to receive electromagnetic signals from the transmit signal chip 12, and respective output ends that are configured to output the electromagnetic signals to the signal modulator 16.

The first substrate 34 can further include an electrical connector 20, and first and second waveguides 18a and 18b that are electrically connected to both the signal modulator 16 and the electrical connector 20. Thus, the first and second waveguides 18a and 18b are electrically connected between the signal modulator 16 and the electrical connector 20. For instance, the first and second waveguides 18a and 18b can have respective input ends that are configured to receive first and second wave propagations, or non-TEM signals, from the signal modulator 16, and respective output ends that are configured to transmit the first and second wave propagations to the electrical connector 20. For instance, the output ends can be aligned with respective waveguides 25 (see, e.g., FIGS. 4A and 4B) of the electrical connector 20 when the electrical connector 20 is placed in electrical communication (e.g., mated or mounted) with the first substrate 34. Alternatively, the output ends can merge with each other, such that the first and second wave propagations, or non-TEM signals, traveling along the first and second waveguides 18a and 18b can merge and propagate through a common one of the waveguides of the electrical connector 20. Alternatively, the waveguides 25 in the electrical connector 20 can merge into a single common waveguide inside the electrical connector 20. Alternatively still, as will be described in more detail below with respect to FIG. 3, the first substrate 34 can include a first common waveguide 19 (FIG. 3) that is connected between the outlet ends of the first and second waveguides 18a and 18b and one of the waveguides of the electrical connector 20. Accordingly, the first and second non-TEM signals can travel through the first and second waveguides 18a and 18b, respectively, and can merge and travel together through the first common waveguide 19 to the one of the waveguides of the electrical connector 20.

The second substrate 36 may include a signal de-modulator 24, and third and fourth waveguides 22a and 22b that are electrically connected between the electrical connector 20 and the signal de-modulator 24. For instance, the third and fourth waveguides 22a and 22b can define respective input ends and output ends opposite the input ends. For instance, the third and fourth waveguides 22a and 22b can have respective input ends that are configured to receive wave propagations from the electrical connector 20, and respective output ends that are configured to transmit the wave propagations to the signal demodulator. For instance, the inlet ends can be aligned with respective waveguides 25 (FIGS. 4A and 4B) of the electrical connector 20 when the electrical connector 20 is placed in electrical communication (e.g., mated or mounted) with the second substrate 36. Alternatively, the inlet ends can be merged with each other, such that respective wave propagations traveling along the common one of the electrical connector 20 travel into the merged inlet ends. The third and fourth waveguides 22a and 22b can diverge away from each other from their respective input ends, such that the first wave propagation propagates through the third waveguide 22a, and the second wave propagation propagates through the fourth waveguide 22b. Alternatively still, as will be described in more detail below with respect to FIG. 3, the second substrate 36 can include a second common waveguide 21 (FIG. 3) that is connected between the electrical connector 20, and in particular the waveguide of the electrical connector 20, and the inlet ends of the third and fourth waveguides 22a and 22b and one of the waveguides of the electrical connector 20. Thus, the first and second wave propagations travel through the second common waveguide 21 from the waveguide of the electrical connector 20, where they split at the third and fourth waveguides 22a and 22b. For instance, the first wave propagation can travel from the second common waveguide 21 to the third waveguide 22a, and the second wave propagation can travel from the second common waveguide 21 to the fourth waveguide 22b.

The second substrate 36 can further include a receive signal device that can be configured as a receive signal chip 32, and third and fourth electrical signal traces 26a and 26b that are electrically connected between the signal de-modulator 24 and the receive signal chip 32. The third and fourth electrical signal traces 26a and 26b can be single-ended or can define a differential pair of traces.

The transmit signal chip 12 is configured to receive an analog or digital signal, and in response generate TEM (transverse electric and magnetic) electrical data signals that can define differential signal pairs or single-ended signals. Differential signals may be sub-divided into a +1V signal and a −1V signal. The transmit signal chip 12 may generate electrical signals with very rapid rise times, such as 35 picoseconds. The rise time may be selected to achieve a desired data transmission rate. The electrical signals generated by the transmit signal chip 12 are communicated over the first and second electrical signal traces 14a and 14b to the signal modulator 16. For instance, the transmit signal chip 12 can communicate a first electrical TEM signal over the first electrical signal trace 14a to the signal modulator 16. The transmit signal chip 12 can communicate a second electrical TEM signal over the second electrical signal trace 14b to the signal modulator 16.

The signal modulator 16 can perform at least three functions. First, the signal modulator 16 is configured to convert the first and second TEM signals to first and second non-TEM signals, respectively. For example, the first and second non-TEM signals can operate in a waveguide mode, such as a transverse electric (TE) mode or a transverse magnetic (TM) mode. Thus, the signal modulator 16 is configured to convert the first and second TEM signals to first and second wave propagations, respectively. Accordingly, for the purposes of the present disclosure, the terms "wave propagation" and "non-TEM signal" can be used interchangeably. Second, the signal modulator 16 can convert the first and second TEM signals to first and second non-TEM signals, respectively, at a common carrier frequency. Thus, the signal modulator 16 can include a common carrier frequency generator. The common carrier frequency can be a narrowband frequency. For instance, if the common carrier frequency at 20 GHz as one example, the narrowband frequency can be 20 GHz±0.5 GHz. This frequency can define a common carrier frequency designed to be compatible with a plurality of different data transfer speeds output by the data communication system 10, as described in more detail below. Third, the signal modulator 16 is configured to excite the first and second waveguides 18a and 18b, so as to cause the first non-TEM signals to propagate along the first waveguide 18a toward the electrical connector 20, and to cause the second non-TEM signals to propagate along the second waveguide 18b toward the electrical connector 20. The excitation may be accomplished by antennae, such as horn, quarter-wave monopole, and loop antennas.

Further, the first substrate 34 can include at least one signal conditioning component. In one example, the first substrate 34 can include an amplifier that is configured to amplify and strengthen the first and second non-TEM signals to maintain amplitude as they propagate along the data communication system 10. One or more amplifiers can be disposed anywhere along the data communication system 10. In one example, the signal modulator 16 can include the amplifier. In another example, the amplifier can be disposed between the signal modulator 16 and the electrical connector 20 so as to receive and transmit the first and second non-TEM signals along the first and second waveguides 18a and 18b, respectively. In another example, the first substrate 34 can alternatively or additionally include a high-pass filter. For instance, the signal modulator 16 can include the high-pass filter. Alternatively, the high-pass filter can be disposed between the transmit signal chip 12 and the signal modulator 16 so as to receive and transmit the first and second TEM signals along the first and second electrical signal traces 14a and 14b, respectively. The high-pass filter removes low frequencies that are not necessary for the transmission of desirable higher frequency signals.

The second substrate 36 can include the signal de-modulator 24, the transmit signal chip 32, the third and fourth waveguides 22a and 22b, respectively, and the third and fourth electrical traces 26a and 26b, respectively, as described above. The third and fourth waveguides 22a and 22b are configured to receive the first and second non-TEM signals that have travelled through the electrical connector 20 as described above. The signal de-modulator 24 is configured to receive the first and second non-TEM signals and convert the non-TEM signals to third and fourth TEM signals that correspond to the first and second TEM signals that are input by the signal modulator 16. The signal de-modulator 24 outputs the third TEM signal to the third electrical trace 26a, and outputs the fourth TEM signal to the fourth electrical trace 26b. In one example, the signal de-modulator 24 can be a multiplex. In this regard, the signal modulator 16 can also be a multiplex. The signal de-modulator 24 can include antennae, such as horn, quarter-wave monopole, and loop antennas, to assist in the receiving the first and second non-TEM signals. The receive signal chip 32 receives the third and fourth TEM signals and converts them to an analog or digital output signal that corresponds to the signal that was received at the transmit signal chip 12.

The second substrate 36 can further include at least one signal conditioning component. For instance, the second substrate 36 can include a low-pass filter 28 that is coupled to the third and fourth signal traces 26a and 26b. For instance, a first portion of the third and fourth electrical signal traces 26a and 26b can be connected between the signal de-modulator 24 and the low-pass filter 28. A second portion of the third and fourth electrical signal traces 26a and 26b can be connected between the low-pass filter and the receive signal chip 32. Thus, the third and fourth TEM signals pass through the low pass filter 28. Alternatively, the low pass filter 28 can be included in the signal de-modulator 24. The low pass filter 28 can be set at a desired frequency so as to exclude frequencies higher than the common carrier frequency.

During operation, first TEM signals are generated by the transmit signal chip 12, and travel along the first electrical trace 14a to the signal modulator 16, where the first TEM signals are converted to first non-TEM signals. The first non-TEM signals travel from the signal modulator 16, through the first waveguide 18a, through the electrical connector 20, through the third waveguide 22a, through the demodulator 24, and are converted to TEM signals that are communicated along the third electrical trace 26a to the receive signal chip 32. Second TEM signals are generated by the transmit signal chip 12, and travel along the second electrical trace 14b to the signal modulator 16, where the second TEM signals are converted to second non-TEM signals. The second non-TEM signals travel from the signal modulator 16, through the second waveguide 18b, through the electrical connector 20, through the fourth waveguide 22b, through the demodulator 24, and are converted to third and fourth TEM signals at the that are communicated along the fourth electrical trace 26b to the receive signal chip 32. The first and second TEM signals can define a differential signal pair, such that one of the first and second TEM signals defines a +1V signal, and the other of the first and second TEM signals defines a −1V signal.

As described above, the first substrate 34 can include the first and second signal traces 14a and 14b, and the first and second waveguides 18a and 18b. The second substrate 36 can include the third and fourth signal waveguides 22a and 22b and the third and fourth signal traces 26a and 26b. Each of the first and second substrates 34 and 36 can further include power planes and traces (not shown), and ground planes (not shown). While the first and second substrates 34 and 36 are described herein as include signal traces 14a and 14b and 26a and 26b and waveguides 18a and 18b and 22a and 22b, respectively, it should be appreciated that the substrates can include as many of the signal traces 14a and 14b and 26a and 26b, and as many of the waveguides 18a and 18b and 22a and 22b, respectively, as desired. In one example, the first substrate 34 can be configured as a first printed circuit board. Similarly, the second substrate 36 can be configured as a second printed circuit board.

For instance, the first substrate 34 can be configured as a daughtercard and the second substrate 36 can be configured as a backplane, and it is appreciated that a data communication architecture can include a plurality of first substrates 34 that are separably mated with the second substrate 36 through respective electrical connectors 20 as described herein. For instance, the electrical connector 20 can mate with the respective first substrate 34, such that the electrical connector 20 can be unmated from the first substrate 34 and subsequently mated again with the first substrate 34 or another daughtercard. The electrical connector 20 can be permanently mounted to the second substrate 36, and is not designed to be separated from the second substrate 36. For instance, the electrical connector 20 can be welded, soldered, or the like to the second substrate 36. Accordingly, separation of the electrical connector 20 from the second substrate 36 is not practical without damaging one or both of the electrical connector 20 and the second substrate 36. Alternatively, the second substrate 36 can be configured as a daughtercard and the first substrate 34 can be configured as a backplane, and it is appreciated that a data communication architecture can include a plurality of second substrates 36 that are separably mated with the first substrate 34 through respective electrical connectors 20 as described herein. For instance, the electrical connector 20 can mate with the respective second substrate 36, such that the electrical connector 20 can be unmated from the first substrate 34 and subsequently mated again with the second substrate 36 or another daughtercard. The electrical connector 20 can be permanently mounted to the first substrate 34, and is not designed to be separated from the first substrate 34. For instance, the electrical connector 20 can be welded, soldered, or the like to the first substrate 34. Accordingly, separation of the electrical connector 20 from the first substrate 34 is not practical without damaging one or both of the electrical connector 20 and the first substrate 34. Alternatively still, the electrical connector 20 can be separably mated to each of the first substrate 34 and the second substrate 36.

The electrical connector 20 may be surface mounted to either or both of the first and second substrates 34 and 36, respectively. Further, the electrical connector 20 may be devoid of press-fit pins. The electrical connector 20 may be further devoid of surface mount tails that contact corresponding pads or vias on the first and second substrates 34, 36. Unlike typical backplane systems, where the first substrate 34 may be a daughtercard and the second substrate 36 may be a midplane or backplane oriented 90 degrees with respect to the daughtercard, only a single electrical connector 20 is positioned between the first substrate 34 and the second substrate 36. The data communication system 10 is devoid of a second electrical connector on either one of the first substrate 34 or the second substrate 36. There is no need for a more traditional beam on blade or beam on beam separable mating interface between a conventional electrical contact-based electrical connector and a complementary electrical component. In midplane applications, only two electrical connectors 20 are needed instead of two electrical connectors on the midplane, one electrical connector on a first daughtercard, and a second electrical connector on a second daughtercard. That is, a first electrical connector can be mounted to one of the midplane and the first daughtercard, and can be separatably mated with the other of the midplane and the first daughtercard. A second electrical connector can be mounted to one of the midplane and the second daughtercard, and can be separatably mated with the other of the midplane and the second daughtercard.

The first and second waveguides 18a and 18b may be dual waveguides for differential signals or may be single waveguides for single-ended signals. Similarly, the third and fourth waveguides 22a and 22b may be dual waveguides for differential signals or may be single waveguides for single-ended signals. Referring to FIGS. 2A and 2B, which illustrate the cross-sectional geometry of the waveguides 18a and 18b and 22a and 22b and the waveguides 25 of the electrical connector 20, such cross-sectional geometry can be rectangular, circular, triangular, pentagon, hexagon, or any other known geometric shape. The waveguides may be or include waveguide channels that are defined by respective internal surfaces of any suitable reflective and electrically conductive waveguide material, such as brass or silver, or any suitable alternative material. In one example, the material can be a metal. The waveguide channels are elongate along a direction of elongation from their respective input ends to their respective output ends. In one example, the respective internal surfaces of the waveguide channels can define at least one gap 37 along a plane that is oriented normal to the direction of elongation along at least a portion of a length of the respective waveguides, thereby eliminating an unwanted mode of non-TEM signal propagation through the respective waveguides. The unwanted mode, for instance, can be a $TE_{2,0}$ mode. In one example, the at least one gap 37 can extend along an entirety of the length of one or more or all the waveguides 18a and 18b, 25, and 22a and 22b. In one example, the at least one gap 37 can be configured as first and second gaps 37 along the plane. The first and second gaps 37 can be disposed at 180 degrees opposite each other, or can otherwise be disposed at other positions with respect to each other as desired.

Referring now to FIGS. 1 and 3, and as described above, the first and second waveguides 18a and 18b can extend between the signal modulator 16 and the electrical connector 20. Because the first and second non-TEM signals can enter the first and second waveguides 18a and 18b, respectively, as a differential signal pair, the first and second non-TEM signals can be out of phase with each other. Prior to outputting the first and second non-TEM signals from the first and second waveguides 18a and 18b, respectively, one or both of the first and second waveguides 18a and 18b can be phase shifted with respect to the other of the first and second waveguides 18a and 18b. The phase shifting can bring the first and second waveguides 18a and 18b in phase with each other.

In one embodiment, the first waveguide 18a can be longer than the second waveguide 18b. That is, the first waveguide 18a can define a first distance from the input end thereof to the output end thereof. The second waveguide 18b can define a second distance from the input end thereof to the output end thereof. The first distance can be greater than the second distance. In particular, the first distance can be greater than the second distance by a first difference that is configured to phase shift the first non-TEM signal by a half-wavelength with respect to the second non-TEM signal. Thus, the first and second non-TEM signals can be in phase with each other when the first and second non-TEM signals exit the first and second waveguides 18a and 18b, respectively. The first non-TEM signal can exit the outlet end of the first waveguide 18a, and the second non-TEM signal can exit the outlet end of the second waveguide 18b, such that the first and second non-TEM signals merge together and propagate together through the first common waveguide 19 as shown in FIG. 3. It should be appreciated that the first non-TEM signal has a first amplitude in the first waveguide 18a, the second wave propagation has a second amplitude in the second waveguide 18b, and the first and second wave propagations combine to define an amplitude in the first common waveguide 19 that is a sum of the first and second amplitudes.

The first and second non-TEM signals can propagate from the first common waveguide and through an aligned one of the waveguides 25 (FIGS. 4A and 4B) of the electrical connector 20 when the electrical connector is in electrical communication with the first substrate 34 (FIG. 1). The first and second non-TEM signals can exit the aligned one of the waveguides 25, and can enter the second common waveguide 21 still in phase with each other. The first non-TEM signal travels from the second common waveguide 21 to the third waveguide 22a. The second non-TEM signal travels from the second common waveguide 21 to the fourth waveguide 22b.

In one embodiment, the fourth waveguide 22b can be longer than the third waveguide 22a. That is, the third waveguide 22a can define a third distance from the input end thereof to the output end thereof. The fourth waveguide 22b can define a fourth distance from the input end thereof to the output end thereof. The fourth distance can be greater than the third distance. In particular, the fourth distance can be greater than the third distance by a second difference that is configured to phase shift the second non-TEM signal by a half-wavelength with respect to the first non-TEM signal. The second difference can be equal to the first difference. Thus, the first and second non-TEM signals can be in out of phase with each other when they exit the third and fourth waveguides 22a and 22b, respectively. The third non-TEM signal can define the first amplitude in the third waveguide 22a, and the fourth non-TEM signal can define the second amplitude in the fourth waveguide 22b.

It will thus be appreciated that when the first and second TEM signals define a differential signal pair, the data communication system 10 (FIG. 1) performs a first offset operation so as to offset the converted first and second non-TEM signals so as to bring the first and second non-TEM signals in phase with each other prior to transmission of the first and second non-TEM signals into a common waveguide. The common waveguide can be defined by one or more or all of the waveguide 25 of the electrical connector 20, the first common waveguide 19, and the second common waveguide 21 as shown in FIG. 3. The data communication system 10 then performs a second offset operation so as to cause the first and second non-TEM signals to be out of phase with each other when the first and second non-TEM signals enter the signal de-modulator 24. Thus, the third and fourth TEM signals output by the signal de-modulator 24 can define a differential signal pair, such that one of the third and fourth TEM signals defines a +1V signal, and the other of the third and fourth TEM signals defines a −1V signal. The first offset operation can be performed by the first and second waveguides 18a and 18b. The second offset operation can be performed by the third and fourth waveguides 22a and 22b. It should be appreciated that the first TEM signal can exit the signal de-modulator 24 as the third TEM signal. Similarly, the second TEM signal can exit the signal de-modulator 24 as the fourth TEM signal. Accordingly, the signal exiting the receive signal chip 32 corresponds to the signal that enters the transmit signal chip 12 as shown in FIG. 1.

Figure 4A:
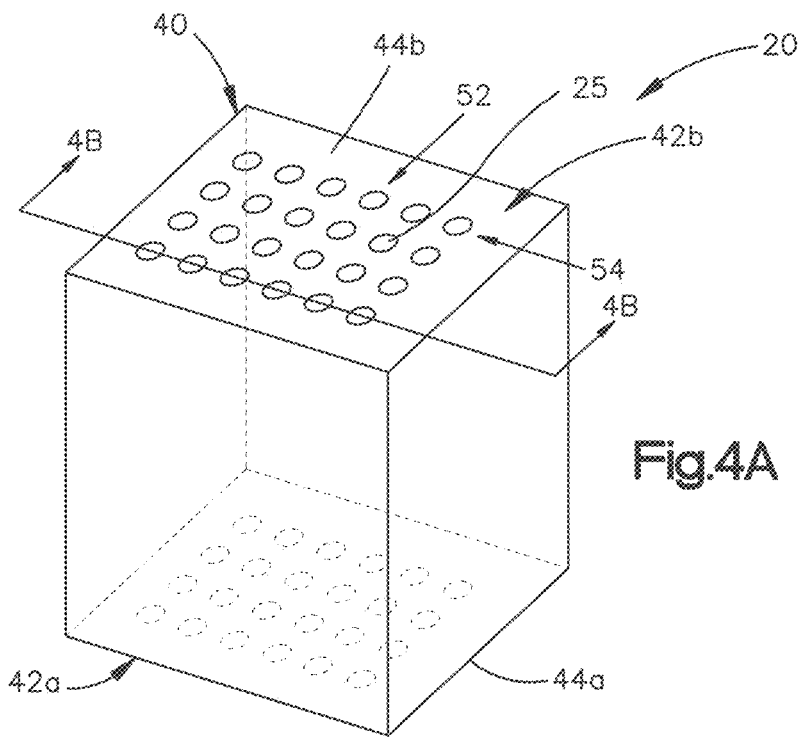
FIG. 4A is a perspective view of the electrical connector of the data communication system illustrated in FIG. 1 in accordance with one embodiment, illustrating the electrical connector as a vertical or mezzanine electrical connector.
Figure 4B:
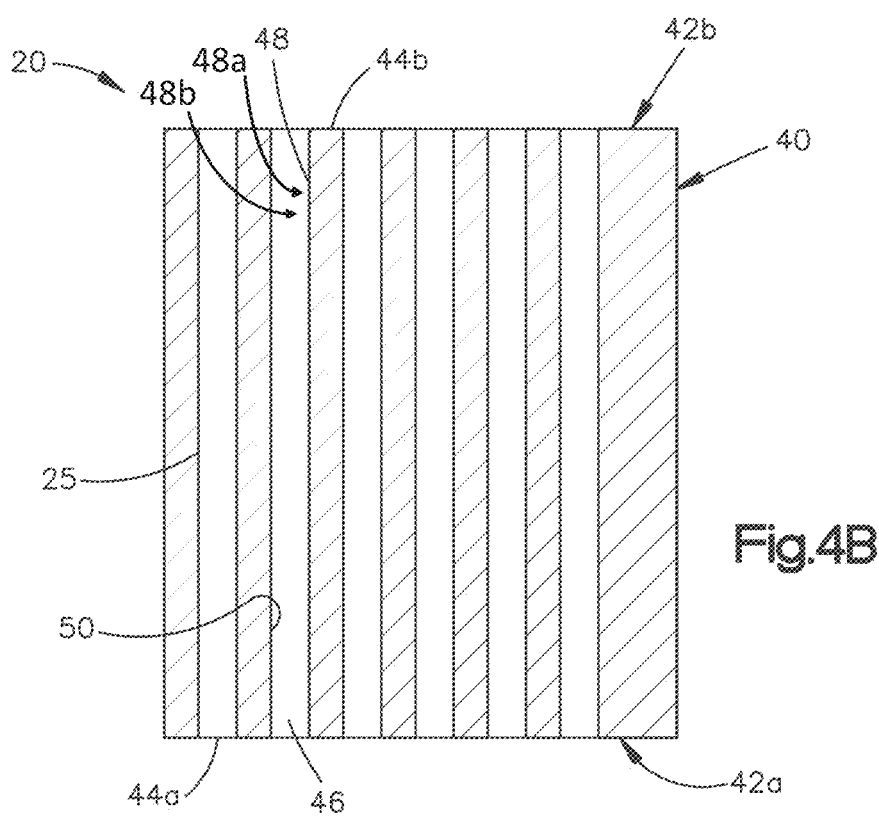
FIG. 4B is a cross-sectional view of the electrical connector illustrated in FIG. 4A, taken along line 4B-4B.

Referring now to FIGS. 4A and 4B, the electrical connector 20 may include a connector body 40 that defines a mating interface 42a and a mounting interface 42b. In one example, the connector body 40 can be dielectric, or electrically nonconductive. The electrical connector 20 can be configured to mate with one of the first and second substrates 34 and 36 at the mating interface, and can be configured to mount to the other of the first and second substrates 34 and 36 as described above with respect to FIG. 1. The connector body 40 defines a first outer surface 44a (FIG. 4B) at the mating interface 42a, and a second outer surface 44b that is different than the first outer surface 44a at the mounting interface 42b. In accordance with one embodiment, the mating interface 42a can be disposed opposite the mounting interface 42b. For instance, the mating interface 42a can be oriented substantially parallel with the mounting interface 42b. Similarly, the first surface 44a can be disposed opposite the second surface 44b. Unless otherwise indicated, the term "substantially" as used to describe an orientation or direction can reflect manufacturing tolerances. For instance, the first surface 44a can be oriented substantially parallel with the second surface 44b. Thus, the electrical connector 20 can be referred to as a "vertical" or "mezzanine" electrical connector. Further, the waveguide channels 46 (FIG. 4B) and thus the waveguides 25, can extend linearly from the first surface 44a to the second surface 44b. Accordingly, the waveguides 25 can be referred to as "vertical waveguides."

The connector body 40 defines a plurality of waveguides 25 that extend from the mating interface 42a to the mounting interface 42b. The waveguides 25 define respective waveguide channels 46 that are open to the first and second surfaces 44a and 44b. Each of the waveguide channels 46 is defined by an internal surface 48 that comprises an electrically conductive and reflective waveguide material 48a as shown in FIG. 4B. The waveguides 25 are configured to propagate electrical signals from one of the first and second surfaces 44a and 44b to the other of the first and second surfaces 44a and 44b. For instance, the electrical signals propagated through the waveguide channels can be configured as one or both of the non-TEM signals received from the first and second waveguides 18a and 18b, either directly or through the first common channel 19 as shown in FIG. 3. The waveguides 25 are configured to propagate the electrical signals from one of the mating interface 42a and the mounting interface 42b to the other of the mating interface 42a and the mounting interface 42b. The waveguides 25 can be arranged in a plurality of rows 52 as shown in FIG. 4A and a plurality of columns 54 that are oriented perpendicular to the rows 52. The connector body 40 may be a single monolithic body that defines a plurality of waveguides 25, including the rows 52 of waveguides 25 and the columns 54 of waveguides 25 (FIG. 4A).

As described above, the waveguide material is reflective and electrically conductive. For instance, the waveguide material can be a metal, such as brass or silver. In one example, the connector body 40 is a monolithic body that is made from the waveguide material. Alternatively, the connector body 40 can be made from any suitable electrically conductive material. The connector body 40 can be a monolithic body that defines the waveguide channels 46 on which the waveguide material is disposed. For instance, if the electrically conductive material of the connector body 40 is electrically conductive but not made from the waveguide material, then the waveguide material can be disposed on the inner body surfaces 50 as described herein. Alternatively still, for instance, the connector body 40 can define a plastic body and a plurality of first channels that extend through the plastic body from the mating interface 42a to the mounting interface 42b so as to define inner body surfaces 50 (FIG. 4B). The waveguide material can be disposed on the inner body surfaces 50 so as to define the waveguide channels 46. For instance, the waveguide material can be coated onto the inner body surfaces 50. In another example, the waveguide material can be overmolded by the plastic connector body 40. For instance, tubes carrying the waveguide material can be overmolded by the plastic connector body 40 so as to define the inner body surfaces 50 and attach the waveguide material to the inner body surfaces 50. The tubes can be subsequently removed (for instance, chemically, mechanically, or otherwise removed). Alternatively, the plastic connector 40 can be coated with the waveguide material.

A waveguide, (intended to transmit high-speed Gigabit data), may include features that substantially reduce the conductive loss at operating frequencies starting around 125 GHz and higher. In some embodiments, such a feature may be a thin layer of dielectric coating 48b (FIG. 4B) on the inside surfaces of the waveguide that reduce the intensity of the electric field immediately inside the waveguide. Effectively, the presence of the dielectric coating causes more of the power transmission to occur in the dielectric and less in the conductor, thus reducing the conductive losses. Most of the tangential magnetic fields propagate in the dielectric and because of the skin effect, die off inside the dielectric, thus substantially reducing the conductive loss. The thickness of the dielectric coating would be chosen to obtain the appropriate current skin depth for the desired operating frequency.

For example, a waveguide of length 10 inches, with a width of 1.25 mm and a height of 0.625 mm and without the coating, at a frequency of 126 GHz, had an Insertion Loss of −9.5 dB.

As a more specific example, a rectangular waveguide may be enclosed with a silver conductor, ($\sigma=6.3\times10^7$ S/m) with Teflon coating,($\varepsilon_r=2.001$, tan $\delta=0.0002$). The coating thickness may be a fraction of the width of the waveguide, such as 10-20% or 5-10% or less than 5% in some embodiments, such that the coating may have a thickness of 0.1 mm or less for certain frequencies.

A dielectric coating may be applied in any suitable way. In some embodiments, the dielectric coating may be applied as a polymer that, upon curing, adheres to the metal forming the walls of the waveguide. Alternatively, the dielectric may be applied as a separate member or members inserted to the waveguide or as a film that is applied, such as with adhesive, to the walls of the waveguide. A coating may also be formed by deposition or, in some embodiments, an insitu reaction, such as growing an oxide on the metal. Such a coating may be applied before the metal is formed into a box-like structure or may be applied after the box-like waveguide structure is formed.

In some embodiments, the dielectric material may be uniformly applied on all walls of the waveguide along the entire length of the waveguide. In other embodiments, the coating may be applied to only some walls of the waveguide. For example, the coating may be applied to only the longer walls of the waveguide or only the shorter walls. In some embodiments, only one of the walls of the waveguide may be coated.

Moreover, it is not a requirement that the coating be uniform over the entire length of waveguide. In some embodiments, some regions of the waveguide may be inaccessible or unplated for other reasons. However, in some embodiments, a dielectric coating with an effective dielectric constant greater than 1.5 ($\varepsilon_r$>1.5) may coat greater than 75% of the surface area of at least one wall of the waveguide.

Alternatively, rather than have conductive walls coated with a dielectric, the waveguide may be made from a hollow dielectric structure that is coated on the outside with a conductive material, For example, a plastic tube may be plated on the outside surface with some conductive material. Such a coating may enable a sufficiently low-loss waveguide that transmits a signal, with a power as is conventionally available in an electronic system, over a length up to 1 meter. Techniques for coating plastic with a metal are known in the art, and any suitable technique for coating may be used, including processes such as sputtering, deposition or wrapping a film or by applying a coating that dries or cures to maintain in place.

Regardless of the specific technique used to form the waveguide, once waveguides are formed, one or more such waveguides may be held by a support structure with a desired orientation to form a connector or other interconnect.

Figure 5A:
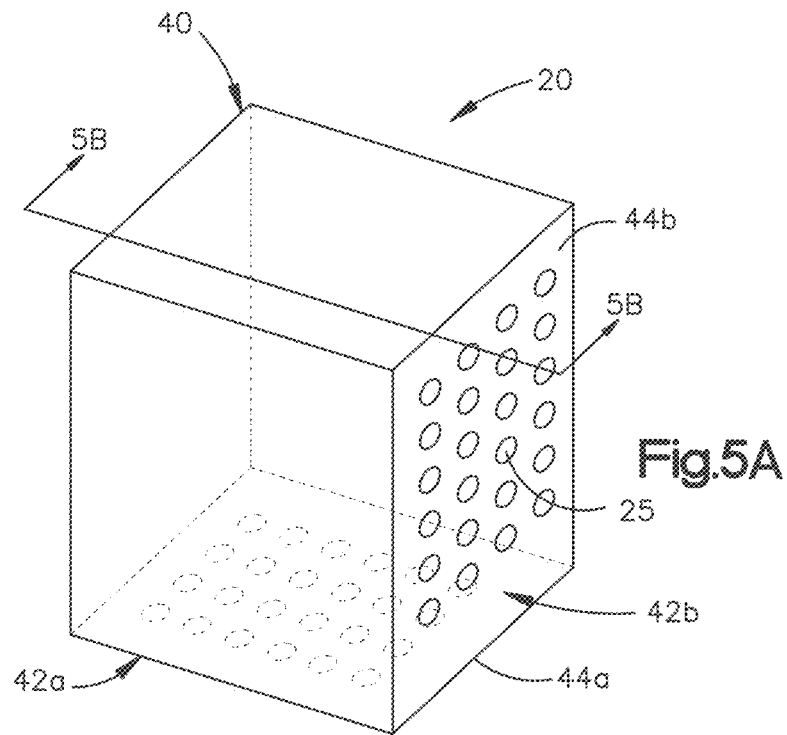
FIG. 5A is a perspective view of the electrical connector of the data communication system illustrate in FIG. 1 in accordance with another embodiment, illustrating the electrical connector as a right-angle electrical connector.
Figure 5B:
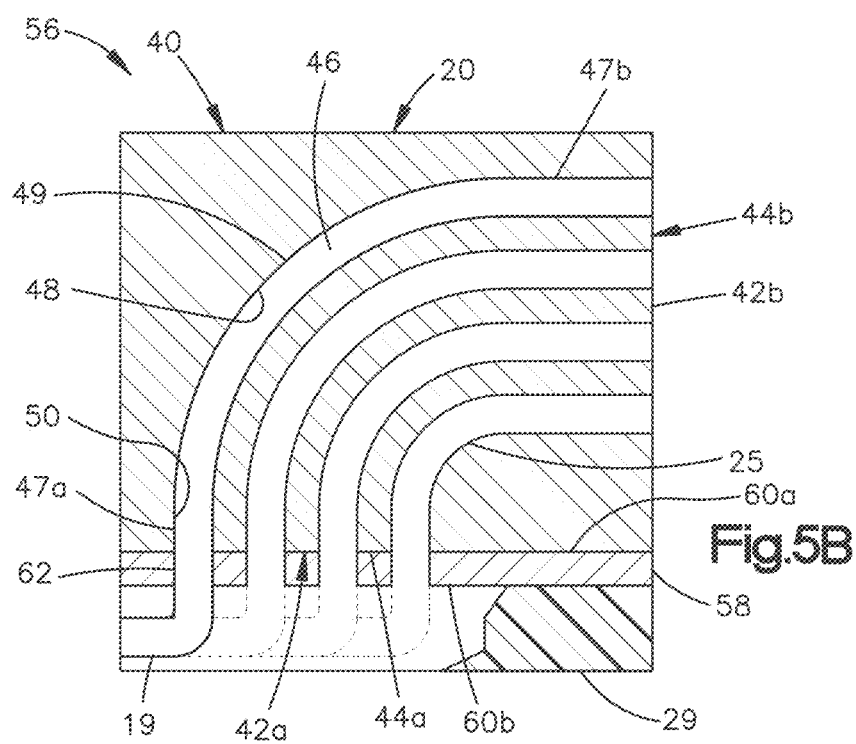
FIG. 5B is a cross-sectional view of a portion of an electrical connector assembly of the data communication assembly in accordance with one embodiment, including the electrical connector of FIG. 5A shown in cross-section along line 5B-5B of FIG. 5A, a gasket, and the first substrate of the data communication system illustrated in FIG. 1.

Referring now to FIGS. 5A and 5B, the mating interface 42a and the mounting interface can be oriented substantially perpendicular with respect to each other. Thus, the first and second external surfaces 44a and 44b can be oriented substantially perpendicular with respect to each other. Thus, the electrical connector 20 can be referred to as a "right angle electrical connector." The waveguides 25 can define an input end at one of the mating interface 42a and the mounting interface 42b, and an output end that is opposite the input end and is disposed at the other of the mating interface 42a and the mounting interface 42b. The waveguides 25 can thus be referred to as "right-angle waveguides." The input ends are configured to receive at least one or both of first and second non-TEM signals from the first and second waveguides 18a and 18b, respectively, either directly or through the first common waveguide 19 as shown in FIG. 3. The output ends are configured to transmit at least one or both of the first and second non-TEM signals to the third and fourth waveguides 22a and 22b, respectively, either directly or through the second common waveguide 21 as shown in FIG. 3. The columns 54 can include both the input end and the output end of a plurality of the waveguides 25 that are aligned along a column direction. The columns 54 can be spaced from each other along a row direction that is perpendicular to the column direction. The rows can be oriented along the row direction. As described above with respect to FIG. 4B, the connector body 40 may be a single monolithic body that defines a plurality of waveguides 25, including the rows of waveguides 25 and the columns 54 of waveguides 25.

As shown in FIG. 5B, one or more or all of the waveguide channels 46 can have a first portion 47a that extends from the first surface 44a, a second portion 47b that extends from the first portion 47a. The second portion 47b can be angularly offset with respect to the first portion 47a. The waveguide channels 46 can each define an elbow 49 that extends between the first portion 47a and the second portion 47b. For instance, the first portion 47a is oriented substantially perpendicular with respect to the second portion 47b. The elbow 49 can be curved as the elbow 49 extends from the first portion 47a to the second portion 47b. Alternatively or additionally, the elbow 49 can define at least one angle between the first portion 47a and the second portion 47b. For instance, the angle can be a right angle.

In order to assist in the propagation of non-TEM signals through the right-angle waveguides 25, the elbow 49 can include a propagation member. In one example, the propagation member can be configured as a hybrid tee coupler. In another example, the propagation member can be configured as a hybrid ring coupler. In yet another example, the propagation member can be configured a projection that extends into the waveguide channel 46 at the elbow 49, the projection having a surface that extends between a first section of the elbow 49 and a second section of the elbow 49 that has an orientation different than the first section of the elbow 49. The surface can be a beveled surface. The projection, and thus the beveled surface, can be made of a respective material that is reflective and electrically conductive.

Whether the electrical connector 20 is a right-angle connector, or a vertical or mezzanine connector, the data communication system 10 can include an electrical connector assembly 56 that includes the electrical connector configured to mate with a first substrate 29 of the electrical connector assembly 56 at the mating interface 42a, and is further configured to be mounted to a second substrate of the electrical connector assembly 56 at the mounting interface 42b. The first substrate 29 of the electrical connector assembly 56 can be defined by one of the first and second substrates 34 and 36 as shown in FIG. 1, and the second substrate of the electrical connector assembly can be defined by the other of the first and second substrates 34 and 36. The electrical connector assembly 56 can further include a gasket 58 that includes a gasket material that is electrically conductive and reflective. The gasket 58 can define a first gasket surface 60a and a second gasket surface 60b opposite the first gasket surface 60a, and a plurality of gasket channels 62 that extend from the first gasket surface 60a to the second gasket surface 60b. The gasket channels 62 are open to the first gasket surface 60a and the second gasket surface 60b. One of the first and second gasket surfaces, such as the first gasket surface 60a, is configured to be placed against the first surface 44a of the electrical connector 20 such that the gasket channels 62 are aligned with the waveguide channels 25, and the other of the first and second gasket surfaces, such as the second surface 60b, is configured to be placed against the first substrate 29, such that the gasket channels 62 are aligned with waveguide channels 18a and 18b or 22a and 22b of the first substrate 29. Because the channels 62 are defined by surfaces that are metallic and electrically conductive, the channels 62 define gasket waveguides. The gasket 58 can create a sealed interface between the electrical connector 20 and the first substrate 29. Further, the gasket 58 can provide EMI shielding for the non-TEM signals. The gasket 58 can define a sealed interface between the electrical connector 20 and the first substrate 34, the electrical connector 20 and the second substrate 36, or both.

The electrical connector assembly 56 can further include any suitable fastener configured to releasably attach the electrical connector 20 to the first substrate 29 while the waveguide channels 25 of the electrical connector 20, the gasket channels 62, and the waveguide channels of the first substrate 29 are all aligned with each other. The gasket 58 can be compressible, so as to compress as the electrical connector 20 is mated to the first substrate 29, such that the first and second surfaces 60a and 60b move toward each other. The fastener can be released so as to unmate the electrical connector 20 from the first substrate 29, and can be reattached to the first substrate 29 or to another substrate to which the electrical connector 20 is to be mated. The electrical connector 20 can further include any suitable guidance member that is configured to mate with a complementary guidance member on the substrate to which the electrical connector 20 is to be mated, so as to place the waveguide channels 25 of the electrical connector 20 in alignment with the waveguide channels of the substrate.

Figure 6:
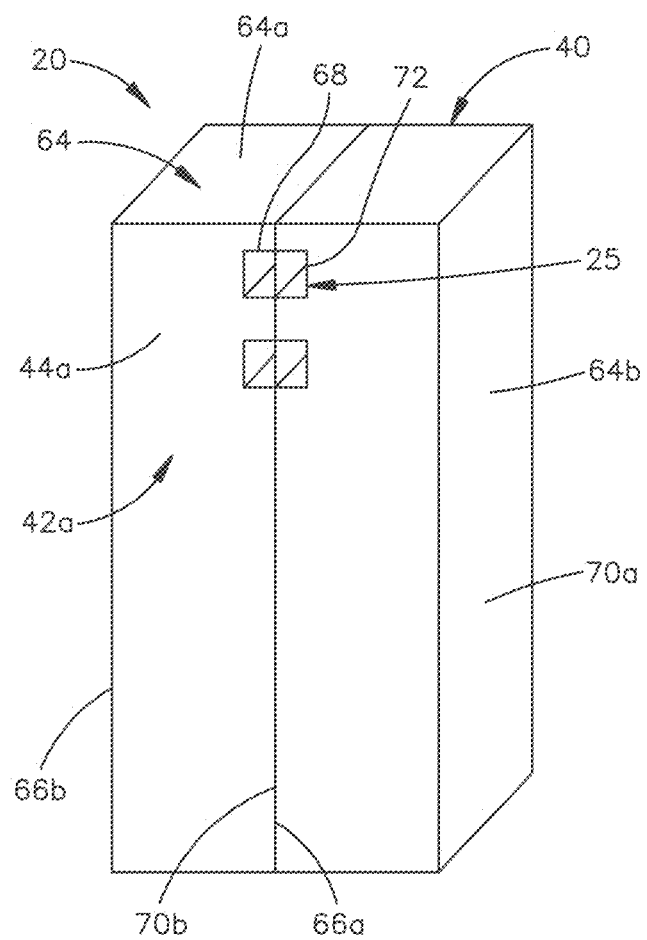
FIG. 6 is a perspective view of the electrical connector of the data communication system of FIG. 1 in accordance with another embodiment, illustrating the electrical connector as including a plurality of electrical connector modules.

Referring to FIG. 6, the electrical connector 20 may include a plurality of connector body portions 64 that can each define a portion of the connector body 40. The connector body portions 64 can be attached to each other so as to define the connector body 40. Each of the connector body portions 64 can be electrically insulative. The waveguide material can be recessed from the respective surfaces of the body portions 64 that attach to each other so as to create the at least one gap 37 described above (see FIGS. 2A and 2B). For instance, each of the connector body portions 64 can be molded. Each of the connector body portions 64 can define one-half or some other fraction of at least one of the waveguides 25, such that two of the connector body portions 64 cooperate to define the at least one of the waveguides 25, or some other structure that permits a waveguide signal to pass from the mating interface 42a to the mounting interface 42b.

The connector body portions 64 can include at least one first body portion 64a having a first external surface 66a and a second external surface 66b opposite the first external surface 66a. The first and second external surfaces 66a and 66b can extend from the first outer surface 44a to the second outer surface (not shown in FIG. 6). The first body portion 64a can define at least one first groove 68, such as a plurality of first grooves 68 in the first external surface 66a. The at least one first groove 68 can extend from the first outer surface 44a to the second outer surface of the first body portion 64a. The connector body portions 64 can further include at least one second body portion 64b having a first external surface 70a and a second external surface 70b opposite the first external surface 70a. The first and second external surfaces 70a and 70b can extend from the first outer surface 44a to the second outer surface of the second body portion 64b. The second body portion 64b can define at least one second groove 72, such as a plurality of second grooves 72 in the second external surface 70b. The at least one first groove 68 can extend from the first outer surface 44a to the second outer surface.

One or more or all of the body portions can be made of an electrically nonconductive material or an electrically conductive material that is different from the waveguide material, and the waveguide material can be disposed on the electrically conductive or nonconductive material in the respective grooves. Alternatively, one or more or all of the body portions can be monolithic body portions made of the waveguide material. The first and second body portions 64a and 64b are attachable to each other such that the first external surface 66a of the first body portion 64a faces the second external surface 70b of the second body portion 64b with respective ones of the first grooves 68 aligned with respective ones of the second grooves 72 so as to define respective ones of the plurality of waveguide channels 46 (FIG. 4B). The defined respective at least one of the plurality of waveguide channels 46 can be configured as a column of waveguide channels 46. When the body portions are made of the waveguide material and the first body portion 64a is attached to the second body portion 64b, respective ones of the first grooves 68 aligned with respective ones of the second grooves 72 so as to define a respective ones of the plurality of waveguides 25 (FIG. 4B).

It should be appreciated that some of the body portions 64a and 64b can define grooves on external surfaces, so as to attach to body portions at both external surfaces to align the grooves on both sides with grooves of the attached body portions, thereby defining a pair of columns of at least one waveguide 25. While one such waveguide 25 is illustrated in FIG. 6, it should be appreciated that the electrical connector 20 can include any number of waveguides 25 that can be vertical or right-angle waveguides as described above. In one example, first and second ones of the connector body portions 64 can be attached to each other so as to define a column of the waveguides 25. In particular, the connector body 40 can define at least one pair of first and second body portions 64a and 64b. For instance, the connector body 40 can define a plurality of pairs of first and second body portions 64a and 64b that are attachable to each other in series so as to define respective pluralities of waveguides 25.

Referring now to FIG. 7, the electrical connector 20 can be configured as an edge card connector that defines a receptacle 74 at the mating interface 42a. The receptacle 74 is configured to receive the one of the first and second substrates 34 and 36 so as to mate the electrical connector 20 with the one of the first and second substrates 34 and 36. The electrical connector 20 can be mounted to the other of the first and second substrates 34 and 36 in the manner described above. The connector 20 can define a pair of first surfaces 44a that define the receptacle 74. Accordingly, a first plurality of the waveguides 25 is open to one of the pair of first surfaces 44a, and a second plurality of the waveguides 25 is open to the other of the pair of first surfaces 44a. It should thus be appreciated that the waveguides 25 can define first and second rows at the first surfaces 44a.

The substrate that is mated with the electrical connector 20 can define input ends of respective waveguides that align with the waveguides 25 (FIG. 7) at each of the pair of first surfaces 44a when the substrate is received in the receptacle 74. Thus, a first plurality of the waveguides of the substrate can define input ends on a first surface of the substrate, and a second plurality of the waveguides of the substrate can define input ends on a second surface of the substrate opposite the first surface. The first surface of the substrate faces the one of the pair of first surfaces 44a so as to align the respective waveguides, and the second surface of the substrate faces the other of the first surfaces 44a so as to align the respective waveguides. In one example, the substrate can be defined by the first substrate 34, such that the plurality of waveguides of the substrate can be defined by the first and second waveguides 18a and 18b (FIG. 3) or the first common waveguide 19 (FIG. 7). Alternatively, the substrate can be defined by the second substrate 36, such that the plurality of waveguides of the substrate can be defined by the third and fourth waveguides 22a and 22b (FIG. 3) or the second common waveguide 21. The substrate to which the electrical connector 20 is mounted can include first and second pairs of waveguides that can be aligned with the respective first and second rows of the waveguides 25 (FIG. 7), either directly or via a respective pair of second common waveguides as described above.

As described above with respect to FIG. 1, the data communication system 10 in accordance with one embodiment includes a first electrical component that can be configured as the first substrate 34, a second electrical component that can be configured as the second substrate 36. As described above, the electrical connector 20 can be separably mated to the first electrical component and mounted to the second electrical component. Alternatively, the electrical connector 20 can be separably mated to the second electrical component and mounted to the first electrical component. Referring now to FIG. 8, in an alternative embodiment of the data communication system 10, the electrical connector 20 can be mounted to the respective electrical component in the form of at least one electrical cable 80 defining at least one waveguide that is aligned with respective ones of the waveguides 25 (FIG. 5A) at the second surface 44b (FIG. 5A) of the electrical connector 20.

When the first electrical component is configured as at least one electrical cable 80, such as a plurality of electrical cables 80, the electrical cables 80 can include the first and second waveguides 18a and 18b (FIG. 3), respectively, alone or in combination with the first common waveguide 19 (FIG. 3). The first and second waveguides 18a and 18b (FIG. 3) can receive respective first and second non-TEM signals from the signal modulator 16 (FIG. 3) in the manner described above. The signal modulator 16 (FIG. 3) and the transmit signal chip 12 (FIG. 1) can be carried by a respective substrate or suitable alternative electrical component as desired. The electrical connector 20 can be separably mated to the second substrate 36.

When the second electrical component is configured as at least one electrical cable, such as a plurality of electrical cables 80, the electrical cables 80 can include the third and fourth waveguides 22a and 22b (FIG. 3) alone or in combination with the second common waveguide 21. The third and fourth waveguides 22a and 22b (FIG. 3) can receive the respective first and second non-TEM signals from the electrical connector 20 in the manner described above. The signal de-modulator 24 and the receive signal chip 32 can be carried by a respective substrate or suitable alternative electrical component as desired. The electrical connector can be separably mated to the first substrate 34.

Alternatively, the at least one electrical cable 80 can define the third and fourth electrical signal traces 26a and 26b (FIG. 1). In this regard, it should be appreciated that the at least one electrical cable 80 can be configured as an active cable. The demodulator 24 can be included as part of the electrical connector 20, or can be attached or otherwise placed in electrical communication with the electrical connector in any manner as desired. The low pass filter 28 can be included in the signal de-modulator 24, or can be attached to the signal de-modulator 24 or placed in electrical communication with the signal de-modulator 24 as described above in any manner desired. The input ends of the third and fourth signal traces 26a and 26b (FIG. 1) of the at least one electrical cable 80 can be attached to the low-pass filter 28 (or de-modulator 24 if the low-pass filter 28 is included in the de-modulator 24), so as to receive the third and fourth TEM signals, respectively, and conduct the third and fourth TEM signals to the receive signal chip 32.

As described above, the signal modulator 16 is configured to produce the first and second non-TEM signals at the common carrier frequency. Another embodiment includes a method of choosing the common carrier frequency that will permit data transfer rates of at least 7 Gbits/sec, at least 10 Gbits/sec, at least 14 Gbits/sec, at least 25 Gbits/sec, at least 28 Gbits/sec, at least 56 Gbits/sec, at least 100 Gbits/sec, or at least 112 Gbits/sec and choosing a waveguide geometry that will permit the first and second non-TEM signals to propagate therethrough at a common carrier frequency of at least at 10 GHz, such as at least 14 GHz, at least 25 GHz, at least 28 GHz, at least 56 GHz, at least 100 GHz, Gbits/sec, up to 112 GHz. It is recognized that propagation of the non-TEM signals at the common carrier frequency can create third and fourth TEM signals at multiple data transfer rates supported by the common carrier frequency. Further, the non-TEM signals propagated at the common carrier frequencies can produce the third and fourth TEM signals at the de-modulator 24 at the data transfer rates having an error rate with respect to the first and second TEM signals generated by the transmit signal chip 12 of no more than 1 error for every $10^4$ to $10^{15}$ bits.

It should be appreciated that the present disclosure can include one or more or all of the following examples:

Example 1. An electrical connector comprising:
a body that defines a mating interface at a first surface and a mounting interface at a second surface that is different than the first surface;
wherein the body defines a plurality of waveguides that extend from the mating interface to the mounting interface, wherein the waveguides define respective waveguide channels that are open to the first and second surfaces, and each of the waveguide channels is defined by an internal surface that comprises an electrically conductive and reflective waveguide material, such that waveguide channels are configured to propagate electrical signals from one of the first and second surfaces to the other of the first and second surfaces,
wherein the waveguides are configured to propagate electrical signals from one of the mating interface and the mounting interface to the other of the mating interface and the mounting interface.

Example 2. The electrical connector as recited in Example 1, wherein the waveguide material is a metal.

Example 3. The electrical connector as recited in Example 2, wherein the metal is brass or silver.

Example 4. The electrical connector as recited in any one of the preceding Examples, wherein the body comprises the waveguide material.

Example 5. The electrical connector as recited in any one of the preceding Examples, wherein the body is a monolithic body that defines the channels.

Example 6. The electrical connector as recited in any one of Examples 1 to 3, wherein the body comprises an electrically nonconductive body.

Example 7. The electrical connector as recited in Example 6, wherein the electrically nonconductive body comprises a plastic body and a plurality of first channels that extend through the plastic from the mating interface to the mounting interface so as to define inner body surfaces, and the waveguide materials is disposed on the inner body surfaces so as to define the waveguide channels.

Example 8. The electrical connector as recited in Example 7, wherein the waveguide material is coated onto the inner body surfaces.

Example 9. The electrical connector as recited in Example 7, wherein the waveguide material is overmolded by the plastic body.

Example 10. The electrical connector as recited in any one of the Examples 1 to 4 and 6 to 9, wherein the body further comprises:
a first body portion having a first external surface that defines a plurality of first grooves extending from the first surface to the second surface; and
a second body portion having a second external surface that defines a plurality of second grooves extending from the first surface to the second surface,
wherein the first and second body portions are attachable to each other such that the first external surface faces the second external surface with respective ones of the first grooves aligned with respective ones of the second grooves so as to define a respective column of the plurality of waveguide channels.

Example 11. The electrical connector as recited in Example 10, wherein the body comprises a plurality of the first and second body portions that are attachable to each other so as to define respective pluralities of columns.

Example 12. The electrical connector as recited in any one of claims 10 to 11, wherein, the second body portion has a first external surface opposite the second external surface, the first external surface of the second body portion defining a plurality of third grooves that extend from the first surface to the second surface,
- the body further includes a third body portion having a respective external surface that defines a plurality of grooves extending from the first surface to the second surface, and
- the second body portion is attachable to the third body portion such that the first external surface of the second body portion faces the external surface of the third body portion with ones of the third grooves aligned with ones of the grooves of the third body portion to define a respective column of the plurality of waveguide channels.

Example 13. The electrical connector as recited in Example 12, wherein one or more or all of the first, second, and third body portions are monolithic body portions made of the waveguide material.

Example 14. The electrical connector as recited in any one of Examples 12 to 13, wherein one or more or all of the first, second, and third body portions are made of an electrically nonconductive material, and the waveguide material is disposed on the electrically nonconductive material in the grooves.

Example 15. The electrical connector as recited in any one of the preceding Examples, wherein the first and second surfaces are oriented substantially parallel to each other.

Example 16. The electrical connector as recited in Example 15, wherein the waveguide channels extend linearly from the first surface to the second surface.

Example 17. The electrical connector as recited in any one of Examples 1 to 14, wherein the first and second surfaces are oriented substantially perpendicular to each other.

Example 18. The electrical connector as recited in Example 17, wherein one or more or all of the channels defines a first portion that extends from the first surface, a second portion that extends from the first portion and is angularly offset with respect to the first portion, and an elbow that extends between the first and second portions.

Example 19. The electrical connector as recited in Example 18, wherein each of the first and second portions is linear.

Example 20. The electrical connector as recited in Example 19, wherein the first portion is oriented substantially perpendicular with respect to the second portion.

Example 21. The electrical connector as recited in any one of Examples 18 to 20, wherein the elbow is curved as it extends from the first portion to the second portion.

Example 22. The electrical connector as recited in any one of Examples 18 to 20, wherein the elbow defines at least one angle between the first portion and the second portion.

Example 23. The electrical connector as recited in Example 22, wherein the at least one angle comprises a right angle.

Example 24. The electrical connector as recited in any one of Examples 18 to 23, wherein the elbow comprises a propagation member that assists in the propagation of the electrical signals.

Example 25. The electrical connector as recited in Example 24, wherein the propagation member comprises a hybrid tee coupler.

Example 26. The electrical connector as recited in Example 24, wherein the propagation member comprises a hybrid ring coupler.

Example 27. The electrical connector as recited in Example 24, wherein the propagation member comprises a projection having a surface that extends between a first section of the elbow and a second section of the elbow having an orientation different than the first section of the elbow.

Example 28. The electrical connector as recited in Example 27, wherein the surface is a beveled surface.

Example 29. The electrical connector as recited in any one of Examples 27 to 28, wherein the projection is made of a respective material that is electrically conductive and reflective.

Example 30. The electrical connector as recited in any one of the preceding Examples, wherein the waveguide channels are elongate along a direction of elongation, and each of the internal surface defines at least one gap along a plane that is oriented normal to the direction of elongation along at least a portion of a length of the waveguides from the first surface to the second surface, thereby eliminating an unwanted mode of propagation through the waveguides.

Example 31. The electrical connector as recited in Example 30, wherein the at least one gap extends along an entirety of the length of the waveguides.

Example 32. The electrical connector as recited in any one of Examples 30 to 31, wherein the at least one gap comprises first and second gaps along the plane.

Example 33. The electrical connector as recited in Example 32, wherein the first and second gaps are 180 degrees opposite each other.

Example 34. An electrical connector assembly comprising:
- the electrical connector as recited in any one of Examples 1 to 33, wherein the electrical connector is configured to mate with a first substrate at the mating interface, and is further configured to be mounted to a second substrate at the mounting interface; and
- a compressible gasket comprising a gasket material that is electrically conductive and reflective, the gasket defining a first gasket surface and a second gasket surface opposite the first gasket surface, and a plurality of gasket channels that extend from the first gasket surface to the second gasket surface,
- wherein one of the first and second gasket surfaces is configured to be placed against the first surface of the electrical connector such that the gasket channels are aligned with the waveguide channels, and the other of the first and second gasket surfaces is configured to be placed against the first substrate, such that the gasket channels are aligned with waveguide channels of the first substrate.

Example 35. The electrical connector assembly as recited in Example 34, wherein the electrical connector comprises a fastener configured to releasably attach the electrical connector to the first substrate while the waveguide channels of the electrical connector, the gasket channels, and the waveguide channels of the first substrate are all aligned with each other.

Example 36. The electrical connector assembly as recited in any one of Examples 34 to 35, wherein the electrical connector comprises a guidance member configured to mate with a complementary guidance member on the first substrate so as to place the waveguide channels of the electrical connector in alignment with the waveguide channels of the first substrate.

Example 37. A data communication system comprising:
a first substrate;
a second substrate; and
an electrical connector mounted to the second electrical connector so as to place the electrical connector in electrical communication with the second electrical connector,
wherein the electrical connector includes an attachment member that is configured to removably attach to the first substrate so as to place the first substrate in electrical communication with the electrical connector, and further in electrical communication with the second substrate through the electrical connector,
wherein the attachment member is detachable from the first substrate, and subsequently reattachable to the first substrate.

Example 38. The data communication system as recited in Example 37, wherein the electrical connector is as recited in any one of Examples 1 to 33.

Example 39. The data communication system as recited in Example 38, wherein the first substrate defines a plurality of waveguides of the first substrate that are aligned with the waveguides of the electrical connector when the electrical connector is attached to the first substrate, and the second substrate defines a plurality of waveguides of the second substrate that are aligned with the waveguides of the electrical connector when the electrical connector is mounted to the second substrate.

Example 40. The data communication system as recited in Example 39, wherein one of the first and second substrates comprises a signal modulator configured to (a) receive first and second TEM signals, (b) convert the TEM signals to first and second non-TEM signals, and (c) excite the first and second non-TEM signals to propagate along first and second waveguides of one of the first and second substrates, respectively.

Example 41. The data communication system as recited in Example 40, wherein the first and second TEM signals define a differential signal pair Example 42. The data communication system as recited in any one of Examples 40 to 41, wherein the signal modulator comprises at least one antenna that excites the first and second non-TEM signals.

Example 43. The data communication system as recited in any one of Examples 40 to 42, wherein the signal modulator comprises an amplifier configured to amplify the first and second non-TEM signals.

Example 44. The data communication system as recited in any one of Examples 40 to 43, further comprising a high pass filter, such that the first and second TEM signals through the high pass filter.

Example 45. The electrical connector as recited in Example 44, wherein the modulator comprises the high pass filter, such that the first and second TEM signals through the high pass filter prior to conversion of the TEM signals to non-TEM signals.

Example 46. The data communication system as recited in any one of Examples 40 to 45, further comprising a transmit signal chip and first and second electrical traces that extend from the transmit signal chip to the modulator, wherein the transmit signal chip is configured to receive a signal and output the first and second TEM signals along the first and second electrical traces, respectively, to the signal modulator.

Example 47. The data communication system as recited in any one of Examples 40 to 46, wherein the signal modulator is configured to output the first and second non-TEM signals at a common carrier frequency, such that third and fourth TEM signals corresponding to the first and second TEM signals are output by the data communication system at a data transfer speed that is selected from a group of multiple different data transfer speeds that are supported by the common carrier frequency, the third and fourth TEM signals having error rate with respect to the first and second TEM signals of no more than 1 error for every $10^4$ to $10^{15}$ bits.

Example 48. The data communication system as recited in Example 47, wherein the first and second waveguides have a size and geometry configured for the non-TEM signals to propagate at the common carrier frequency.

Example 49. The data communication system as recited in any one of Examples 40 to 48, wherein the one of the first and second substrates comprises a first common waveguide, such that the first and second waveguides merge into the first common waveguide that receives each of the first and second non-TEM signals and is aligned with one of the waveguides of the electrical connector when the electrical connector is in electrical communication with the one of the first and second substrates.

Example 50. The data communication system as recited in Example 49, wherein the first waveguide is longer than the second waveguide such that the first non-TEM signals are phase shifted with respect to the second non-TEM signals as the first and second non-TEM signals exit the first and second waveguides, respectively, and enter the first common waveguide.

Example 51. The data communication system as recited in Example 50, wherein the first and second non-TEM signals are in phase with each other in the first common waveguide.

Example 52. The electrical connector as recited in any one of Examples 49 to 51, wherein the one of the first and second substrates comprises a plurality of first and second waveguides and a plurality of first common waveguides that extend from respective pairs of the first and second waveguides, and each of the first common waveguides is aligned with a respective one of the waveguides of the electrical connector when the electrical connector is in electrical communication with the one of the first and second substrates.

Example 53. The data communication system as recited in any one of Examples 49 to 52, wherein the other of the first and second substrates comprises a second common waveguide that is in electrical communication with the one of the waveguides of the electrical connector.

Example 54. The data communication system as recited in Example 53, wherein the other of the first and second substrates comprises third and fourth waveguides that are open to the second common waveguide and diverge from the second common waveguide, such that the first and second non-TEM signals propagate from the second common waveguide through the third and fourth waveguides, respectively.

Example 55. The data communication system as recited in Example 54, wherein the fourth waveguide is longer than the third waveguide so as to phase shift the second non-TEM signal a half-wavelength with respect to the first non-TEM signal, such that the first and second non-TEM signals are out of phase with each other as they exit the third and fourth waveguides, respectively.

Example 56. The data communication system as recited in any one of Examples 54 to 55, wherein the other of the first and second substrates comprises a signal demodulator having an input that is coupled to the third and fourth waveguides, and an output that is coupled to third and fourth electrical traces.

Example 57. The data communication system as recited in Example 56, wherein the signal demodulator receives the first and second non-TEM signals that are out of phase with each other from the third and fourth waveguides, respectively.

Example 58. The data communication system as recited in Example 57, wherein the signal demodulator converts the first and second non-TEM signals to third and fourth TEM signals, respectively, and outputs the third and fourth TEM signals to the third and fourth electrical traces, respectively.

Example 59. The data communication system as recited in Example 58, wherein the third and fourth TEM signals define a differential signal pair.

Example 60. The data communication system as recited in any one of Examples 58 to 59, wherein the third and fourth TEM signals correspond to the first and second TEM signals, respectively.

Example 61. The data communication system as recited in any one of Examples 58 to 60, wherein the other of the first and second substrates comprises a low pass filter, and the third and fourth TEM signals pass through the low pass filter.

Example 62. The data communication system as recited in any one of Examples 58 to 61, wherein the other of the first and second substrates comprises a receive signal chip that receives the third and fourth signals and outputs signals corresponding to the signals input by the transmit signal chip.

Example 63. The data communication system as recited in any one of Examples 56 to 62, wherein the signal demodulator comprises at least one antenna that receives the third and fourth non-TEM signals.

Example 64. The data communication system as recited in any one of Examples 58 to 63, wherein the third and fourth TEM signals define a differential signal pair.

Example 65. The data communication system as recited in any one of Examples 40 to 64, wherein each of the Non-TEM signals comprises a wave propagation.

Example 66. The data communication system as recited in any one of Examples 37 to 65, wherein each of the waveguides is elongate along a respective direction of elongation, and at least one of the waveguides is split into first and second portions separated from each other by at least one gap along a plane that is oriented normal to the respective direction of elongation along at least a portion of a length of the at least one of the waveguides, thereby eliminating an unwanted mode of propagation through the waveguides.

Example 67. The data communication system as recited in Example 66, wherein the at least one gap extends along an entirety of the length of at least one of the waveguides.

Example 68. The data communication system as recited in any one of Examples 66 to 67, wherein the at least one gap comprises first and second gaps along the plane.

Example 69. The data communication system as recited in Example 68, wherein the first and second gaps are 180 degrees opposite each other.

Example 70. The data communication system as recited in any one of Examples 66 to 69, wherein each of the waveguides is split so as to define the at least one gap.

Example 71. The data communication system as recited in any one of Examples 38 to 70, further comprising a compressible gasket comprising a gasket material that is electrically conductive and reflective, the gasket defining a first gasket surface and a second gasket surface opposite the first gasket surface, and a plurality of gasket channels that extend from the first gasket surface to the second gasket surface, wherein one of the first and second gasket surfaces is configured to be placed against the electrical connector such that the gasket channels are aligned with the waveguide channels of the electrical connector, and the other of the first and second gasket surfaces is configured to be placed against the first substrate, such that the gasket channels are aligned with waveguide channels of the first substrate.

Example 72. The data communication system as recited in any one of Examples 37 to 71, wherein each of the first substrate comprises a first printed circuit board, and the second substrate comprises a second printed circuit board.

Example 73. A substrate comprising:
a body;
a first waveguide supported by the body, the first waveguide configured to propagate a first wave propagation;
a second waveguide supported by the body, the second waveguide configured to propagate a second wave propagation; and
a common waveguide positioned such that the first and second waveguides merge into the common waveguide,
wherein the first waveguide is longer than the second waveguide so that the when the first and second wave propagations enter the first and second wave guides, respectively, out of phase with each other, the first and second wave propagations exit the first and second waveguides, respectively, in phase with each other.

Example 74. The substrate as recited in Example 73, wherein the first and second waveguides are in phase with each other in the common waveguide.

Example 75. The substrate as recited in any one of Examples 73 to 74, wherein the first wave propagation has a first amplitude in the first waveguide, the second wave propagation has a second amplitude in the second waveguide, and the first and second wave propagations combine to define an amplitude in the common waveguide that is a sum of the first and second amplitudes.

Example 76. The substrate as recited in any one of Examples 73 to 75, wherein the substrate comprises a plurality of first and second waveguides and a plurality of common waveguides that extend from respective pairs of the first and second waveguides.

Example 77. The substrate as recited in Example 76, configured to attach to an electrical connector such that a respective output end of each of the common waveguides is aligned with a respective one of a plurality of waveguides of the electrical connector.

Example 78. The substrate as recited in any one of Examples 73 to 77, wherein each of the first, second, and common waveguides define respective waveguide channels that are defined by a respective internal surface that comprises an electrically conductive and reflective waveguide material.

Example 79. The substrate as recited in Example 78, wherein the body defines inner body surfaces, and the waveguide material is disposed on the inner body surfaces so as to define the internal surfaces.

Example 80. The substrate as recited in any one of Examples 78 to 79, wherein the waveguide material comprises brass or silver.

Example 81. The substrate as recited in any one of Examples 73 to 80, wherein the substrate comprises a signal modulator configured to (a) receive first and second TEM signals, (b) convert the TEM signals to first and second non-TEM signals, and (c) excite the first and second non-TEM signals to propagate along first and second waveguides, respectively.

Example 82. The substrate as recited in Example 81, wherein the first and second TEM signals define a differential signal pair Example 83. The substrate as recited in any one of Examples 81 to 82, wherein the signal modulator comprises at least one antenna that excites the first and second non-TEM signals to propagate along the first and second waveguides, respectively.

Example 84. The substrate as recited in any one of Examples 81 to 83, comprising comprises an amplifier configured to amplify the first and second non-TEM signals.

Example 85. The substrate as recited in Example 84, wherein the signal modulator comprises the amplifier.

Example 86. The substrate as recited in any one of Examples 81 to 85, further comprising a high pass filter, such that the first and second TEM signals pass through the high pass filter.

Example 87. The substrate as recited in Example 86, wherein the modulator comprises the high pass filter, such that the first and second TEM signals pass through the high pass filter prior to conversion of the TEM signals to non-TEM signals.

Example 88. The substrate as recited in any one of Examples 81 to 87, further comprising a transmit signal chip and first and second electrical traces that extend from the transmit signal chip to the modulator, wherein the transmit signal chip is configured to receive a signal and output the first and second TEM signals along the first and second electrical traces, respectively, to the signal modulator.

Example 89. The substrate as recited in any one of Examples 81 to 88, wherein the signal modulator is configured to output the first and second non-TEM signals to the first and second waveguides at a common carrier frequency of at least 10 GHz.

Example 90. The substrate as recited in Example 89, wherein the first and second waveguides have a size and geometry configured for the first and second non-TEM signals to propagate therethrough at the common carrier frequency.

Example 91. The substrate as recited in any one of Examples 78 to 90, wherein each of the first, second, and common waveguides is elongate along a respective direction of elongation, and at least one of the first, second, and common waveguides is split into first and second portions separated from each other by at least one gap along a plane that is oriented normal to the respective direction of elongation along at least a portion of a length of the at least one of the waveguides, thereby eliminating an unwanted mode of propagation therethrough.

Example 92. The substrate as recited in Example 91, wherein the at least one gap extends along an entirety of the length of at least one of the waveguides.

Example 93. The substrate as recited in any one of Examples 91 to 92, wherein the at least one gap comprises first and second gaps along the plane.

Example 94. The substrate as recited in Example 93, wherein the first and second gaps are 180 degrees opposite each other.

Example 95. The substrate as recited in any one of Examples 91 to 94, wherein each of the waveguides is split so as to define the at least one gap.

Example 96. The substrate as recited in any one of Examples 73 to 95, further comprising an attachment member that is configured to removably attach to an electrical connector so as to align the common waveguides of the substrate with respective ones of a plurality of waveguides of the electrical connector, wherein the attachment member is detachable from the electrical connector, and subsequently reattachable to the electrical connector.

Example 97. The substrate as recited in any one of Examples 73 to 96, configured as a printed circuit board.

Example 98. A substrate comprising:
a body;
a common waveguide supported by the body, the common waveguide configured to propagate first and second wave propagations that are in phase with each other,
a first waveguide supported by the body and extending from an output end of the common waveguide, the first waveguide configured to propagate the first wave propagation; and
a second waveguide supported by the body and extending from the output end of the common waveguide, the second waveguide configured to propagate the second wave propagation,
wherein the second waveguide is longer than the first waveguide, so that the when the first and second wave propagations enter the first and second wave guides in phase with each other, and exit the first and second wave guides, respectively, out of phase with each other.

Example 99. The substrate as recited in Example 98, wherein the second waveguide is longer than the first waveguide by one half of a wavelength of the second wave propagation.

Example 100. The substrate as recited in any one of Examples 98 to 99, wherein the first and second wave propagations have a combined amplitude in the common waveguide, and the first and second wave propagations each have one half the combined amplitude in the first and second waveguides, respectively.

Example 101. The substrate as recited in any one of Examples 98 to 100, wherein the substrate comprises a plurality of common waveguides, and a plurality of first and second waveguides such that respective pairs of the first and second waveguides extend from respective ones of the common waveguides.

Example 102. The substrate as recited in Example 101, configured to attach to an electrical connector such that a respective input of each of the common waveguides is aligned with a respective one of a plurality of waveguides of the electrical connector.

Example 103. The substrate as recited in any one of Examples 98 to 102, wherein each of the first, second, and common waveguides define respective waveguide channels that are defined by a respective internal surface that comprises an electrically conductive and reflective waveguide material.

Example 104. The substrate as recited in Example 103, wherein the body defines inner body surfaces, and the waveguide material is disposed on each of the inner body surfaces so as to define the internal surfaces.

Example 105. The substrate as recited in any one of Examples 102 to 104, wherein the waveguide material comprises brass or silver.

Example 106. The substrate as recited in any one of Examples 98 to 105, wherein the substrate comprises a signal demodulator configured to (a) receive first and second wave propagations from the first and second waveguides, (b) convert the first and second wave propagations to first and second TEM signals, respectively, and (c) output the first and second TEM signals onto first and second signal traces, respectively, of the substrate.

Example 107. The substrate as recited in Example 106, wherein the first and second TEM signals define a differential signal pair Example 108. The substrate as recited in any one of Examples 106 to 107, wherein the signal demodulator comprises at least one antenna that receives the first and second wave propagations from the first and second waveguides, respectively.

Example 109. The substrate as recited in any one of Examples 106 to 108, further comprising a receive signal chip that receives the first and second electrical traces, wherein the receive signal chip is configured to receive the first and second TEM signals and output a signal.

Example 110. The substrate as recited in any one of Examples 106 to 109, further comprising a low pass filter, such that the first and second TEM signals pass through the low pass filter prior to the receive signal chip.

Example 111. The substrate as recited in any one of Examples 98 to 110, wherein the substrate is inseparably mounted to an electrical connector such that the common waveguides of the substrate are aligned with respective ones of a plurality of waveguides of the electrical connector.

Example 112. The data communication system as recited in any one of Examples 98 to 111, wherein each of the first, second, and common waveguides is elongate along a respective direction of elongation, and at least one of the first, second, and common waveguides is split into first and second portions separated from each other by at least one gap along a plane that is oriented normal to the respective direction of elongation along at least a portion of a length of the at least one of the waveguides, thereby eliminating an unwanted mode of propagation therethrough.

Example 113. The data communication system as recited in Example 112, wherein the at least one gap extends along an entirety of the length of at least one of the waveguides.

Example 114. The data communication system as recited in any one of Examples 112 to 113, wherein the at least one gap comprises first and second gaps along the plane.

Example 115. The data communication system as recited in Example 114, wherein the first and second gaps are 180 degrees opposite each other.

Example 116. The data communication system as recited in any one of Examples 112 to 115, wherein each of the waveguides is split so as to define the at least one gap.

Example 117. The substrate as recited in any one of Examples 98 to 116, configured as a printed circuit board.

Example 118. A system for propagating differential signals, comprising:
a first waveguide having a first input end configured receive a first non-TEM signal, and a first output end opposite the first input end, wherein the first waveguide is configured to propagate a first non-TEM signal from the first input end to the first output end;
a second waveguide having a second input end configured to receive a second non-TEM signal, and a second output end opposite the second input end, wherein the second waveguide is configured to propagate a second non-TEM signal from the second input end to the second output end, wherein the first and second non-TEM signals are out of phase with each other when they are received at the first and second input ends, respectively; and
a common waveguide having a common waveguide input end and a common waveguide output end opposite the common waveguide input end,
wherein the first waveguide defines a first length from the first input end to the first output end, the second waveguide defines a second length from the second input end to the second output end, and the first length is greater than the second length, such that the first non-TEM signal is in phase with the second non-TEM signal when the first and second non-TEM signals enter the common waveguide input end;

Example 119. The system as recited in Example 118, wherein the first and second non-TEM signals are equal and opposite each other when they enter the first and second inputs, respectively.

Example 120. The system as recited in any one of Examples 118 to 119, wherein the first length is greater than the second length by one half of a wavelength of the first non-TEM signal.

Example 121. The system as recited in any one of Examples 118 to 120, further comprising:
a third waveguide having a third input end and a third output end opposite the third input end, wherein the third input end is in communication with the common waveguide output end;
a fourth waveguide having a fourth input end and a fourth output end opposite the fourth input end, wherein the fourth input end is in communication with the common waveguide output end;
wherein each of the third and fourth input ends are coupled to the common waveguide output end, such that the third waveguide is configured to propagate the first non-TEM signal from the common waveguide, and the fourth waveguide is configured to propagate the second non-TEM signal from the common waveguide.

Example 122. The system as recited in Example 121, wherein the fourth waveguide is longer than the third waveguide from their respective input ends to their respective output ends, such that the first and second non-TEM signals are out of phase with each other at the third and fourth output ends, respectively.

Example 123. The system as recited in any one of Examples 121 to 122, wherein the first and second non-TEM signals are equal and opposite each other when they exit the third and fourth output ends, respectively.

Example 124. The system as recited in any one of Examples 121 to 123, wherein the common waveguide is defined by an electrical connector.

Example 125. The system as recited in any one of Examples 121 to 123, wherein the common waveguide input end extends from the first and second output ends, and the common waveguide output end is configured to be in alignment with a waveguide of an electrical connector so as to transmit the first and second non-TEM signals to the waveguide of the electrical connector.

Example 126. The system as recited in any one of Examples 121 to 123, wherein the third and fourth input ends extend from the common waveguide output end, and the common waveguide input end is configured to be in alignment with a waveguide of an electrical connector so as to receive the first and second non-TEM signals from the waveguide of the electrical connector.

Example 127. The system as recited in any one of Examples 121 to 123, wherein.
the common waveguide is a first common waveguide, the common waveguide input end is a first common waveguide input end, and the common waveguide output end is a first common waveguide output end,
the first common waveguide input end extends from each of the first and second output ends so as to receive each of the first and second non-TEM signals from the first and second waveguides, respectively, the system further comprises a second common waveguide having a second common waveguide input end, and a second common waveguide output end opposite the second common waveguide input end;

the second common waveguide input end is configured to receive the first and second non-TEM signals; and the third and fourth input ends extend from the second common waveguide output end.

Example 128. The system as recited in Example 127, wherein the first common waveguide output end is configured to align with an input end of a waveguide of an electrical connector, and the second common waveguide input end is configured to align with an output end the waveguide of the electrical connector, such that the first and second non-TEM signals propagate through the first common waveguide, through the waveguide of the electrical connector, and through the second common waveguide.

Example 129. The system as recited in any one of Examples 121 to 128, wherein each of the waveguides define respective waveguide channels that are defined by a respective internal surface that comprises an electrically conductive and reflective waveguide material.

Example 130. The system as recited in Example 129, wherein the waveguide material comprises brass or silver.

Example 131. The system as recited in any one of Examples 129 to 130, wherein each of the waveguides is elongate along a respective direction of elongation, and at least one of the waveguides is split into first and second portions separated from each other by at least one gap along a plane that is oriented normal to the respective direction of elongation along at least a portion of a length of the at least one of the waveguides, thereby eliminating an unwanted mode of propagation therethrough.

Example 132. The system as recited in Example 131, wherein the at least one gap extends along an entirety of the length of at least one of the waveguides.

Example 133. The system as recited in any one of Examples 131 to 132, wherein the at least one gap comprises first and second gaps along the respective plane.

Example 134. The system as recited in Example 133, wherein the first and second gaps are 180 degrees opposite each other.

Example 135. The system as recited in any one of Examples 131 to 134, wherein each of the waveguides is split so as to define the at least one gap.

Example 136. The system as recited in any one of Examples 121 to 135, further comprising a signal modulator configured to (a) receive first and second TEM signals, (b) convert the TEM signals to the first and second non-TEM signals, and (c) excite the first and second non-TEM signals to propagate through first and second waveguides, respectively.

Example 137. The system as recited in Example 136, wherein the first and second TEM signals define a differential signal pair Example 138. The system as recited in any one of Examples 136 to 137, wherein the first and second waveguides are coupled to the signal modulator at the first and second input ends, respectively.

Example 139. The system as recited in any one of Examples 136 to 138, further comprising a transmit signal chip and first and second electrical traces that extend from the transmit signal chip to the modulator, wherein the transmit signal chip is configured to receive a signal and output the first and second TEM signals corresponding to the received signal along the first and second electrical traces, respectively, to the signal modulator.

Example 140. The substrate as recited in Example 139, wherein the substrate comprises a signal demodulator configured to (a) receive first and second non-TEM signals from the third and fourth waveguides, (b) convert the first and second wave propagations to third and fourth TEM signals, respectively, that correspond to the first and second TEM signals, and (c) output the third and fourth TEM signals onto third and fourth signal traces, respectively, of the substrate.

Example 141. The substrate as recited in Example 140, wherein the third and fourth TEM signals output by the signal demodulator define a differential signal pair.

Example 142. The substrate as recited in any one of Examples 140 to 141, wherein the signal demodulator comprises at least one antenna that receives the first and second wave propagations from the third and fourth waveguides, respectively.

Example 143. The substrate as recited in any one of Examples 140 to 142, further comprising a receive signal chip that receives the third and fourth electrical traces, wherein the receive signal chip is configured to receive the third and fourth TEM signals and output a signal corresponding to the signal input by the transmit signal chip.

Example 144. The system as recited in any one of Examples 136 to 143, wherein the receive signal chip is configured to output the third and fourth TEM signals at data transfer speeds, and the modulator is configured to output the first and second non-TEM signals at a common carrier frequency, such that the non-TEM signals propagate through the first and second waveguides at the common carrier frequency that is configured to produce the third and fourth TEM signals at the data transfer speed that is selected from a group of multiple different data transfer speeds that are supported by the common carrier frequency.

Example 145. The system as recited in Example 144, wherein the first and second waveguides have a size and geometry configured for the first and second non-TEM signals to propagate therethrough, respectively, so as to produce each of the multiple different data transfer speeds within the group of multiple different data transfer speeds.

Example 146. A method of data transmission, the method comprising the steps of:

receiving first and second TEM signals that define a differential signal pair;

converting the first and second TEM signals to non-TEM signals;

offsetting one of the first and second non-TEM signals with respect to the other of the first and second non-TEM signals, such that the first and second non-TEM signals are in phase with each other; and after the offsetting step, propagating the first and second non-TEM signals along at least one common waveguide.

Example 147. The method as recited in Example 146, wherein the receiving step comprises receiving the first and second TEM signals from respective first and second electrical traces.

Example 148. The method as recited in any one of Examples 146 to 147, wherein the receiving step and the converting step are performed by a signal modulator.

Example 149. The method as recited in any one of Examples 146 to 148, wherein the offsetting step comprises propagating the first non-TEM signal along a first waveguide from a first input end of a first waveguide to a first output end of the first waveguide, and propagating the second non-TEM signal along a second waveguide from a second input end of the second waveguide to a second output end of the second waveguide, wherein the first waveguide defines a first length from the first input end to the first output end, the second waveguide defines a second length from the second input end to the second output end, and the length distance is greater than the second length.

Example 150. The method as recited in Example 149, wherein the offsetting step comprises outputting the first and second non-TEM signals from the first and second output ends, such that the first and second non-TEM signals are in phase with each other.

Example 151. The method as recited in any one of Examples 149 to 150, further comprising the step of propagating the first non-TEM signal from an output end of the at least one common waveguide to a third waveguide that extends from the output end of the at least one common waveguide, and propagating the second non-TEM signal from the output end of the at least one common waveguide to a fourth waveguide that extends from the output end of the at least one common waveguide.

Example 152. The method as recited in Example 151, further comprising propagating the first non-TEM signal through the third waveguide, and propagating the second non-TEM signal through the fourth waveguide,
wherein the third waveguide defines a third waveguide input end that is coupled to the output end of the at least one common waveguide and a third waveguide output end so as to define a third length from the third input end to the third output end, the fourth waveguide defines a fourth waveguide input end that is coupled to the output end of the at least one common waveguide and a fourth waveguide output end so as to define a fourth length from the fourth input end to the fourth output end that is greater than the third length.

Example 153. The method as recited in Example 152, wherein a difference between the first length and the second length is equal to a difference between the fourth length and the third length.

Example 154. The method as recited in Example 153, comprising outputting the first and second non-TEM signals from the third and fourth output ends, respectively, such that the first and second non-TEM signals are out of phase with each other.

Example 155. The method as recited in Example 154, wherein the step of outputting the first and second non-TEM signals comprises outputting the first and second non-TEM signals from the third and fourth output ends, respectively, such that respective phases of the first and second non-TEM signals are equal and opposite each other.

Example 156. The method as recited in Example 155, further comprising, after the step of outputting the first and second non-TEM signals, converting the first and second non-TEM signals to third and fourth TEM signals, respectively, that define a differential signal pair.

Example 157. The method as recited in Example 156, comprising the step of, after the converting step, outputting the third and fourth TEM signals at a first data transfer speed.

Example 158. The method as recited in Example 157, wherein the step of converting the first and second TEM signals to non-TEM signals further comprises transmitting the first and second non-TEM signals at a common carrier frequency of at least 10 GHz.

Example 159. The method as recited in Example 158, further comprising the step of identifying at least one of a size and shape of the first, second, common, third, and fourth waveguides configured to propagate the first and second non-TEM signals at the common carrier frequency.

Example 160. The method as recited in Example 159, comprising the step of outputting the third and fourth TEM signals at one of a first data transfer speed and a second data transfer speed that is different than the first data transfer speed and supported by the common carrier frequency.

Example 161. The method as recited in any one of Examples 146 to 160, wherein the at least one common waveguide comprises a waveguide of an electrical connector that is in communication with each of the first, second, third, and fourth waveguides.

Example 162. The method as recited in Example 161, wherein the at least one common waveguide further comprises a first common waveguide, and the method comprises receiving the first and second non-TEM signals from the first and second waveguides at the first common waveguide, and outputting the first and second non-TEM signals from the first common waveguide to the waveguide of the electrical connector.

Example 163. The method as recited in Example 162, wherein the at least one common waveguide further comprises a second common waveguide, and the method comprises receiving the first and second non-TEM signals from the waveguide of the electrical connector, and outputting the first and second non-TEM signals to the third and fourth waveguides, respectively.

Example 164. A method of transmitting data over a data transmission network, comprising the steps of:
a) receiving a first plurality of TEM signals;
b) selecting a common carrier frequency;
c) converting the received transmitted first plurality of TEM signals to a first plurality of non-TEM signals;
d) propagating the first plurality of non-TEM signals along at least one waveguide at the common carrier frequency of at least 10 GHz, the at least one waveguide having a size and shape;
e) converting the propagated first plurality of non-TEM signals to a first plurality of TEM signals;
f) outputting the converted first plurality of TEM signals at a first data transfer speed among a plurality of data transfer speeds that are compatible with the common carrier frequency; and
g) after the outputting step, receiving a second plurality of TEM signals;
h) converting the transmitted second plurality of TEM signals to a second plurality of non-TEM signals;
i) propagating the second plurality of non-TEM signals along the at least one waveguide at the common carrier frequency, the at least one waveguide having the size and shape;
j) converting the propagated second plurality of non-TEM signals to a second plurality of TEM signals;
k) outputting the converted second plurality of TEM signals at a second data transfer speed that is different than the first data transfer speed and is among the plurality of data transfer speeds that are compatible with the common carrier frequency.

Example 165. The method as recited in Example 164, wherein the first receiving step comprises receiving the first plurality of TEM signals including first differential signal pairs.

Example 166. The method as recited in Example 165, wherein the first propagating step comprises propagating a first one of the first plurality of non-TEM signals along a first waveguide, and propagating a second one of the first plurality of non-TEM signals along a second waveguide, wherein the second waveguide is shorter than the first waveguide, such that the first and second ones of the first plurality of non-TEM signals exit the first and second waveguides, respectively, in phase with each other.

Example 167. The method as recited in Example 165, comprising the step of receiving the first and second ones of the first plurality of non-TEM signals at the first and second waveguides out of phase with each other.

Example 168. The method as recited in any one of Examples 165 to 167, wherein the second receiving step comprises receiving the second plurality of TEM signals including second differential signal pairs.

Example 169. The method as recited in Example 168, wherein the second propagating step comprises propagating a first one of the second plurality of non-TEM signals along the first waveguide, and propagating a second one of the second plurality of non-TEM signals along the second waveguide, such that the first and second ones of the second plurality of non-TEM signals exit the first and second waveguides, respectively, in phase with each other.

Example 170. The method as recited in Example 169, comprising the step of receiving the first and second ones of the second plurality of non-TEM signals at the first and second waveguides out of phase with each other.

Example 171. The method as recited in any one of Examples 169 to 170, further comprising:
  l) after the second outputting step, receiving a third plurality of TEM signals;
  m) converting the transmitted third plurality of TEM signals to a third plurality of non-TEM signals;
  n) propagating the third plurality of non-TEM signals along the at least one waveguide at the common carrier frequency, the at least one waveguide having the size and shape;
  o) converting the propagated third plurality of non-TEM signals to a third plurality of TEM signals;
  p) outputting the converted third plurality of TEM signals at a third data transfer speed that is different than each of the first and second data transfer speeds and is among the plurality of data transfer speeds that are compatible with the common carrier frequency.

Example 172. The method as recited in Example 171, wherein the third receiving step comprises receiving the third plurality of TEM signals including third differential signal pairs.

Example 173. The method as recited in Example 172, wherein the third propagating step comprises propagating a first one of the third plurality of non-TEM signals along the first waveguide, and propagating a second one of the third plurality of non-TEM signals along the second waveguide, such that the first and second ones of the third plurality of non-TEM signals exit the first and second waveguides, respectively, in phase with each other.

Example 174. The method as recited in Example 173, comprising the step of receiving the first and second ones of the third plurality of non-TEM signals at the first and second waveguides out of phase with each other.

Example 175. A method of transmitting data through a connector having a connector body and a connector waveguide having an input end at a first surface of the connector body and an output end at a second surface of the connector body different than the first surface, the method comprising the step of:
  receiving first and second wave propagations that are in phase with each other at the input end;
  propagating the first and second wave propagations through the connector waveguide; and
  outputting the first and second wave propagations at the output end.

Example 176. The method as recited in Example 175, wherein the propagating step comprises propagating the first and second wave propagations from the first surface to the second surface that is oriented substantially parallel to the first surface.

Example 177. The method as recited in Example 175, wherein the propagating step comprises propagating the first and second wave propagations from the first surface to the second surface that is oriented substantially perpendicular to the first surface.

Example 178. The method as recited in any one of Examples 175 to 177, further comprising, prior to the receiving step, inputting the first and second wave propagations into first and second waveguides, respectively, when the first and second wave propagations are out of phase with each other.

Example 179. The method as recited in Example 178, further comprising the step of outputting the first and second wave propagations out the first and second waveguides, respectively, such that the first and second wave propagations are in phase with each other.

Example 180. The method as recited in Example 179, comprising propagating the first wave propagation along a first distance through the first waveguide, and propagating the second wave propagation a second distance through the second waveguide, the first distance greater than the second distance.

Example 181. The method as recited in any one of Examples 179 to 180, comprising merging the first and second wave propagations prior to entering the input end of the connector waveguide.

Example 182. The method as recited in any one of Examples 175 to 181, comprising propagating the first and second wave propagations from the first and second wave propagations, respectively, through a first common waveguide, and outputting the first and second wave propagations from the first common waveguide into the connector waveguide.

Example 183. The method as recited in Example 182, wherein the step of outputting the first and second wave propagations at the output end comprises propagating the first and second wave propagations through third and fourth waveguides, respectively.

Example 184. The method as recited in Example 183, further comprising the step of phase shifting the first and second wave propagations such that the first and second wave propagations are out of phase with each other when they exit the third and fourth waveguides, respectively.

Example 185. The method as recited in any one of Examples 183 to 184, wherein the fourth waveguide is longer than the third waveguide, such that the first and second wave propagations exit the third and fourth waveguides out of phase with each other.

Example 186. The method as recited in Example 185, further comprising the step of producing first and second TEM signals that define a differential signal pair.

Example 187. The method as recited in Example 186, further comprising the step of converting the first and second TEM signals to the first and second wave propagations, respectively.

Example 188. The method as recited in any one of Examples 186 to 187, further comprising the step of converting the first and second wave propagations to third and fourth TEM signals, respectively.

Example 189. The method as recited in any one of Examples 186 to 188, further comprising the step of converting the first and second wave propagations to third and fourth TEM signals, respectively, after the first and second wave propagations have exited the third and fourth waveguides, respectively.

Example 190. The method as recited in Example 189, further comprising the step of directing the third and fourth TEM signals through a low pass filter.

Example 191. The method as recited in any one of Examples 188 to 190, comprising the step of propagating the first and second wave propagations at a common carrier frequency.

Example 192. The method as recited in Example 191, comprising outputting the third and fourth TEM signals at a first one of a plurality of data transfer speeds among a group of data transfer speeds that are compatible with the common carrier frequency.

Example 193. The method as recited in any one of Examples 183 to 192, wherein the inputting, outputting, and propagating steps are performed at the first and second waveguides defined by a first substrate that is in electrical communication with the electrical connector.

Example 194. The method as recited in Example 193, further comprising the step of mating the first substrate with the first electrical connector, such that the first substrate and the first electrical connector are separably and subsequently re-matable with each other.

Example 195. The method as recited in any one of Examples 181 and 182, wherein the first substrate comprises a daughter card.

Example 196. The method as recited in any one of Examples 193 to 195, wherein the step of propagating the first and second wave propagations through the third and fourth waveguides, respectively, is performed at the third and fourth waveguides defined by a second substrate that is in electrical communication with the electrical connector.

Example 197. The method as recited in Example 196, wherein the second substrate comprises a backplane.

Example 198. The method as recited in any one of Examples 175 to 177, wherein the outputting step comprises propagating the first and second wave propagations through third and fourth waveguides, respectively.

Example 199. The method as recited in Example 198, further comprising the step of phase shifting the first and second wave propagations such that the first and second wave propagations are out of phase with each other.

Example 200. The method as recited in any one of Examples 198 to 199, wherein the fourth waveguide is longer than the third waveguide, such that the first and second wave propagations exit the third and fourth waveguides out of phase with each other.

Example 201. The method as recited in Example 200, further comprising the step of producing first and second TEM signals that define a differential signal pair.

Example 202. The method as recited in Example 201, further comprising the step of converting the first and second TEM signals to the first and second wave propagations, respectively.

Example 203. The method as recited in any one of Examples 201 to 202, further comprising the step of converting the first and second wave propagations to third and fourth TEM signals, respectively.

Example 204. The method as recited in any one of Examples 201 to 203, further comprising the step of converting the first and second wave propagations to third and fourth TEM signals, respectively, after the first and second wave propagations have exited the third and fourth waveguides, respectively.

Example 205. The method as recited in Example 204, further comprising the step of directing the third and fourth TEM signals through a low pass filter.

It should be appreciated that, for simplicity of illustration, features are described in connection with specific examples. However, the features may be used alone or in combination. Accordingly, it should be understood that embodiments are contemplated that combine features associated with the separate examples.

What is claimed is:
1. An electrical connector, comprising:
   a first interface configured for electrical communication with a first printed circuit board (PCB);
   a second interface configured for electrical communication with an electronic component; and
   a plurality of waveguides configured to propagate non-transverse-electromagnetic (non-TEM) signals between the first interface and the second interface.
2. The electrical connector of claim 1, wherein the second interface is configured to align the plurality of waveguides with a respective plurality of signal channels of the electronic component to transmit and/or receive the non-TEM signals to and/or from a demodulator and/or a modulator of the electronic component.
3. The electrical connector of claim 1, wherein the first interface comprises a mounting interface configured for mounting to the first PCB.
4. The electrical connector of claim 3, wherein the second interface comprises a mounting interface configured for mounting to a second PCB.
5. The electrical connector of claim 4, wherein the mounting interface of the first interface comprises a first surface configured to be parallel to the first PCB when mounted to the first PCB and the mounting interface of the second interface comprises a second surface configured to be parallel to the second PCB when mounted to the second PCB, the first and second surfaces being parallel to one another.
6. The electrical connector of claim 4, wherein the mounting interface of the first interface comprises a first surface configured to be parallel to the first PCB when mounted to the first PCB and the mounting interface of the second interface comprises a second surface configured to be parallel to the second PCB when mounted to the second PCB, the first and second surfaces being perpendicular to one another.
7. The electrical connector of claim 1, wherein the second interface comprises a mating interface configured for separably mating with the electronic component.
8. The electrical connector of claim 7, wherein the mating interface of the second interface is configured to align ones of the plurality of waveguides with respective waveguides of the electronic component.
9. The electrical connector of claim 7, wherein the mating interface of the second interface is configured for separably mating with a cable.
10. The electrical connector of claim 1, wherein the non-TEM signals comprise transverse-electric (TE) or transverse-magnetic (TM) signals.
11. The electrical connector of claim 1, wherein the electrical connector comprises a monolithic body having the plurality of waveguides extending therethrough.
12. The electrical connector of claim 1, wherein the first interface is configured to receive and/or provide the non-TEM signals from and/or to a modulator and/or demodulator of the first PCB.

13. A data communication system, comprising:
- an electrical connector comprising a plurality of waveguides, each waveguide configured to propagate non-transverse-electromagnetic (non-TEM) signals; and
- a modulator and/or demodulator in electrical communication with the electrical connector and configured to convert the non-TEM signals propagating in the plurality of waveguides of the electrical connector to and/or from transverse-electromagnetic (TEM) signals.

14. The data communication system of claim 13, wherein the modulator and/or demodulator comprises an antenna configured to excite and/or be excited by at least one of the non-TEM signals propagating in the plurality of waveguides.

15. The data communication system of claim 14, wherein the modulator and/or demodulator further comprises an amplifier and/or a filter, with the antenna coupled between the amplifier and/or filter and the electrical connector.

16. The data communication system of claim 13, wherein the non-TEM signals comprise transverse-electric (TE) or transverse-magnetic (TM) signals.

17. The data communication system of claim 13, wherein the TEM signals comprise differential signal pairs.

18. The data communication system of claim 17, wherein the plurality of waveguides comprise dual waveguides configured to propagate differential non-TEM signals.

19. The data communication system of claim 13, wherein the plurality of waveguides comprise:
- a plurality of pairs of first waveguides, each pair configured to propagate respective differential signal components of a differential non-TEM signal; and
- a plurality of second waveguides coupled to respective pairs of the plurality of pairs of first waveguides, each of the plurality of second waveguides configured to propagate a common-mode sum of the differential signal components of the differential non-TEM signal propagating in the respective pair of first waveguides.

20. The data communication system of claim 19, wherein each pair of the plurality of pairs of first waveguides comprise different waveguide lengths configured to shift the differential signal components of the differential non-TEM signal out of phase with one another by a half-wavelength.

* * * * *